US012041315B2

(12) United States Patent
Yi et al.

(10) Patent No.: US 12,041,315 B2
(45) Date of Patent: Jul. 16, 2024

(54) APPARATUS AND METHOD FOR IMPROVING TRANSMISSION EFFICIENCY OF VIDEO CONTENT FOR WI-FI

(71) Applicant: Intel Corporation, Santa Clara, CA (US)

(72) Inventors: Zhaohua Yi, Portland, OR (US); Laurent Cariou, Portland, OR (US); Dave Cavalcanti, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 694 days.

(21) Appl. No.: 17/129,957

(22) Filed: Dec. 22, 2020

(65) Prior Publication Data

US 2021/0227301 A1     Jul. 22, 2021

(51) Int. Cl.
*H04N 21/61*     (2011.01)
*H04N 21/4363*   (2011.01)
*H04N 21/6375*   (2011.01)

(52) U.S. Cl.
CPC ..... *H04N 21/615* (2013.01); *H04N 21/43637* (2013.01); *H04N 21/6375* (2013.01)

(58) Field of Classification Search
CPC ............ H04N 21/6375; H04N 21/615; H04N 21/43637; H04N 21/4425; H04W 74/08; H04W 74/006; H04W 72/121; H04W 84/12; H04W 52/0287; H04W 52/0229; H04W 76/14; H04W 4/21; H04W 8/005; H04W 76/22; H04W 4/80; Y02D 30/70; H04L 27/26; H04L 67/51; H04L 69/321; H04L 67/125; H04L 67/104; H04L 63/0428; H04M 1/72412; H04M 2250/06

See application file for complete search history.

(56) References Cited

U.S. PATENT DOCUMENTS

| | | | |
|---|---|---|---|
| 7,676,223 B2 * | 3/2010 | Das | H04B 7/022 455/445 |
| 7,729,238 B2 * | 6/2010 | Shin | H04L 27/2605 370/479 |
| 9,385,881 B2 * | 7/2016 | Stahl | H04L 69/22 |
| 9,538,567 B2 * | 1/2017 | Yamaura | H04W 52/0229 |
| 9,794,650 B2 * | 10/2017 | Nakamura | H04N 21/8451 |
| 10,104,451 B2 * | 10/2018 | Nakamura | H04N 21/64322 |

(Continued)

*Primary Examiner* — Jung Liu
(74) *Attorney, Agent, or Firm* — East IP P.C.

(57) ABSTRACT

Provided herein are apparatus and methods for improving transmission efficiency of video content for Wireless Fidelity (Wi-Fi). An apparatus for a Wi-Fi device comprises a Radio Frequency (RF) interface and processing circuitry coupled with the RF interface. The processing circuitry is to encode a Medium Access Control (MAC) frame, to carry video content to be transmitted to one or more other Wi-Fi devices connected with the Wi-Fi device; encapsulate the MAC frame into a physical (PHY) frame, the PHY frame is to include an additional byte in a high-efficiency signal-A (HE-SIG-A) field, to indicate whether the MAC frame is encoded as an original MAC frame including one Frame Check Sequence (FCS) or a video content specific MAC frame including more than one FCSs; and transmit the PHY frame, via the RF interface, to the one or more other Wi-Fi devices.

25 Claims, 13 Drawing Sheets

100

(56) References Cited

U.S. PATENT DOCUMENTS

| | | | | |
|---|---|---|---|---|
| 11,743,875 B2* | 8/2023 | Matsuo | ................. | H04L 5/0092 |
| | | | | 370/329 |
| 2010/0091759 A1* | 4/2010 | Stahl | ................... | H04L 12/2832 |
| | | | | 370/347 |
| 2015/0071147 A1* | 3/2015 | Yamaura | ............... | H04L 67/104 |
| | | | | 370/311 |
| 2017/0006608 A1* | 1/2017 | Josiam | .................... | H04L 5/001 |
| 2018/0242355 A1* | 8/2018 | Lou | ....................... | H04W 74/08 |
| 2019/0182653 A1* | 6/2019 | Yamaura | ........... | H04W 52/0287 |
| 2021/0126743 A1* | 4/2021 | Shabdanov | ........... | H04L 1/1614 |
| 2023/0155793 A1* | 5/2023 | Seok | .................... | H04L 1/1607 |
| | | | | 370/338 |
| 2023/0371012 A1* | 11/2023 | Matsuo | .................. | H04L 27/26 |
| 2024/0022352 A1* | 1/2024 | Lou | ....................... | H04L 1/0079 |

\* cited by examiner

100

200

| MAC HEADER 210 | MAC FRAME BODY 1 220 | FCS1 230 | DUPLICATED MAC HEADER 310 | DUPLICATED MAC FRAME BODY 1 320 | DUPLICATED FCS1 330 | MAC FRAME BODY 2 240 | FCS2 250 |

300

400

| ELEMENT ID = DUAL FCSS 510A | LENGTH 520A | YES OR NO 530A |
|---|---|---|

| ELEMENT ID = TRIPLE FCSS 510B | LENGTH 520B | YES OR NO 530B |
|---|---|---|

| ORIGINAL HE-SIG-A 610A | ADDITIONAL BYTE 620A |
|---|---|

| ORIGINAL HE-SIG-A 610B | DUPLICATION INDICATION 630B | ADDITIONAL BYTE 620B |
|---|---|---|

APPARATUS AND METHOD FOR IMPROVING TRANSMISSION EFFICIENCY OF VIDEO CONTENT FOR WI-FI

TECHNICAL FIELD

Embodiments of the present disclosure generally relate to wireless communications, and particularly to apparatuses and methods for improving transmission efficiency of video content for Wireless Fidelity (Wi-Fi).

BACKGROUND

Video content, which may include data for conventional videos or Virtual Reality (VR), composes a major part of traffic transmitted in a Wi-Fi network, and thus consumes a considerable amount of Wi-Fi bandwidth. As a result, improving transmission efficiency of video content can significantly improve the performance of the Wi-Fi network.

BRIEF DESCRIPTION OF THE DRAWINGS

Embodiments of the disclosure will be illustrated, by way of example and not limitation, in the figures of the accompanying drawings, in which like reference numerals refer to similar elements.

FIG. 5A shows an example of a new information element, according to embodiments of the disclosure.

FIG. 5B shows another example of the new information element, according to embodiments of the disclosure.

FIG. 6A shows an example of an extended HE-SIG-A field, according to embodiments of the disclosure.

FIG. 6B shows another example of the extended HE-SIG-A field, according to embodiments of the disclosure.

DETAILED DESCRIPTION

Figure 1:
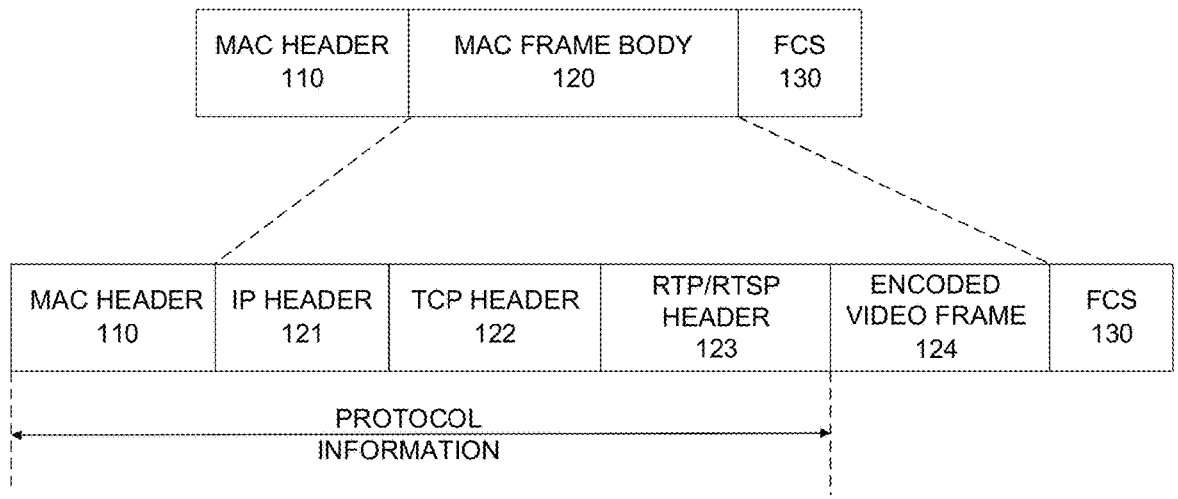
FIG. 1 shows an example format of an original MAC frame, according to embodiments of the disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context indicates otherwise. The phrases "A or B" and "A/B" mean "(A), (B), or (A and B)."

A "Wi-Fi network", as used herein, refers to a network established based on the Institute of Electrical and Electronic Engineers (IEEE) 802.11 family standards, such as, IEEE 802.11 a/b/g/n. Embodiments of the present application provides techniques for improving transmission efficiency of video content in the Wi-Fi network. Particularly, the techniques may be applied, for example, in the IEEE 802.11be standard (which may be called Wi-Fi Extremely High Throughput (EHT)), or any other appropriate standards.

In the wireless communication, a frame check sequence (FCS) of a Medium Access Control (MAC) frame is used to verify content encoded in the MAC frame, at a receiver, before decoding the content. If an error is detected during the verification and cannot be corrected by the receiver, retransmission of the content is required. The problem is especially serious in the Wi-Fi network, because retransmission of the content causes extra bandwidth consumption and latency for transmitting protocol information (such as, Short InterFrame Spacing (SIFS)), response information (such as, an Acknowledgement (ACK)), back-off information, and deferring information, etc., besides the bandwidth consumption and latency for transmitting data.

As known, retransmission will consume a lot of bandwidth and will increase the latency. Currently, in the Wi-Fi network, a packet must be retransmitted, if an error is detected during the verification and cannot be corrected by the receiver. As mentioned, video content, including data for conventional videos or VR, composes a major part of traffic transmitted in the Wi-Fi network. For the video content, if there are limited bit errors which will not significantly impact playback of the video, it is not very necessary to retransmit the content. In this case, retransmission may waste unnecessary bandwidth and cause unnecessary latency.

As used herein, an "original MAC frame" refers to a conventional Wi-Fi data frame. FIG. 1 shows an example format of an original MAC frame 100, according to embodiments of the disclosure. As shown, the original MAC frame 100 may include three parts: an MAC header 110, an MAC frame body 120, and an FCS 130. The FCS 130 is to be used to verify the MAC header 110 and the MAC frame body 120. The MAC frame body 120 includes protocol information and data to be transmitted. For example, when the original MAC frame 100 is used to transmit video content, the MAC frame body 120 may include protocol information, such as, an Internet Protocol (IP) header 121, a Transmission Control Protocol (TCP) header 122, and a Real-time Transport Protocol (RTP)/Real Time Streaming Protocol (RTSP) header 123, and the video content 124 encoded therein. When the original MAC frame 100 is used to transmit other data, the MAC frame body 120 may include the protocol information and the other data encoded therein. As shown in FIG. 1, in the description, the protocol information may include the MAC header 110, the IP header 121, the TCP header 122, and the RTP/RTSP header 123, etc.

As mentioned above, if there are limited/bearable bit errors in the received video content which will not significantly impact playback of the video, it is not very necessary to retransmit the content. However, if the original MAC frame 100 of FIG. 1 is used to transmit the video content as usual, any bit errors that may impact the receiver to recover the video content will cause the retransmission of the whole data frame.

Figure 2:
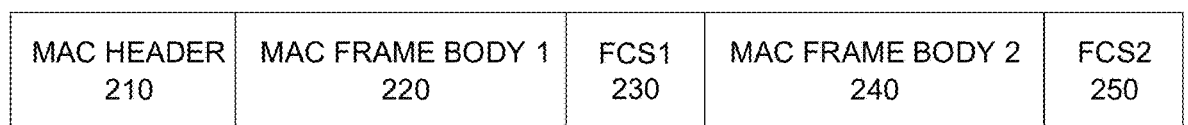
FIG. 2 shows an example format of a video content specific MAC frame, according to embodiments of the disclosure.

Embodiments of the present application provides a novel format of an MAC frame specifically for transmitting the video content, which may be called a "video content specific MAC frame" in the description. FIG. 2 shows an example format of a video content specific MAC frame 200, according to embodiments of the disclosure.

The video content specific MAC frame 200 may include five parts: an MAC header 210, a first MAC frame body (MAC frame body 1) 220, a first FCS (FCS1) 230, a second MAC frame body (MAC frame body 2) 240 and a second FCS (FCS2) 250. The MAC header 210 may be the same as the MAC header 110 of the original MAC frame 100 of FIG. 1. The MAC header 210 and the first MAC frame body 220 carry the protocol information. The first MAC frame body 220 may include protocol information, such as, the IP header 121, the TCP header 122, and the RTP/RTSP header 123, as shown in FIG. 1. The first FCS 230 is to be used to verify the MAC header 210 and the first MAC frame body 220, i.e., the protocol information. The second MAC frame body 240 may include the video data to be transmitted, such as, the encoded video content 124 of FIG. 1. The second FCS 250 is to be used to verify the second MAC frame body 240.

Figures 3, 4:
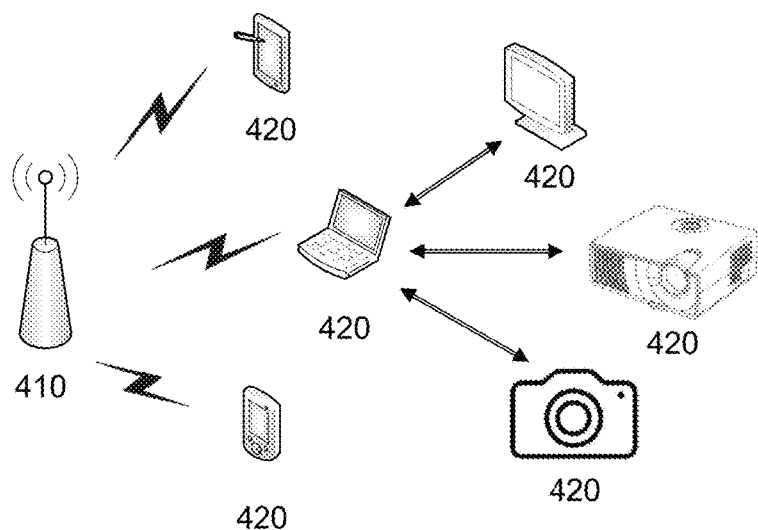
FIG. 3 shows another example format of a video content specific MAC frame, according to embodiments of the disclosure.
FIG. 4 shows example scenarios of a Wi-Fi network, where the solutions of embodiments of the disclosure may be applied.

FIG. 3 shows another example format of a video content specific MAC frame 300, according to embodiments of the disclosure. The video content specific MAC frame 300 is similar as the video content specific MAC frame 200 of FIG. 2, except for that the MAC header 210, the first MAC frame body 220 and the first FCS 230 are duplicated. As can be seen, the video content specific MAC frame 300 further includes a duplicated MAC header 310, a duplicated first MAC frame body 320 and a duplicated first FCS 330.

The MAC header 210, first MAC frame body 220 and first FCS 230 are duplicated, in order to improve a success rate of the transmission of the frame. As mentioned, the first MAC frame body 220 includes protocol information, such as, the IP header 121, the TCP header 122, and the RTP/RTSP header 123, and is thus short, and therefore, the duplication of the MAC header 210, first MAC frame body 220 and first FCS 230 would not cause significant bandwidth consumption. The duplication can significantly increase the reliability, with a small cost of bandwidth.

FIG. 4 shows example scenarios of a Wi-Fi network 400, where the solutions of embodiments of the disclosure may be applied. The Wi-Fi network 400 may include one or more access points (APs) 410 (though only one AP 410 is illustrated in the figure) and one or more Wi-Fi devices 420, which may communicate in accordance with IEEE 802.11 communication standards. The Wi-Fi devices 420 may be mobile devices that are non-stationary (e.g., not having fixed locations), for example, mobile phones, laptop computers, Personal Digital Assistants (PDAs), cameras, projectors, and so on, or may be stationary devices, such as, televisions (TVs), desktop computers, vending machines, and so on. In some embodiments, the APs 410 and Wi-Fi devices 420 may include one or more function modules similar to those in the functional diagram of FIG. 10 and/or the example machine/system of FIG. 11.

As shown in FIG. 4, the Wi-Fi devices 420 may communicate via the AP 410, or connect and communicate with each other directly without using an AP.

The Wi-Fi devices 420 may use the video content specific MAC frame 200 of FIG. 2, or the video content specific MAC frame 300 of FIG. 3 to carry the video content to be transmitted. The Wi-Fi devices 420 may use the original MAC frame 100 of FIG. 1 to transmit contents other than the video content, such as, text content.

During initial association establishment process of the Wi-Fi devices 420 with each other, a beacon frame, an association request frame, and an association response frame may include a new information element. The new information element will enable a transmitter and a receiver to notify each other their capability of dealing with (including encoding and decoding) the video content specific MAC frame, such as the video content specific MAC frame 200 of FIG. 2 or the video content specific MAC frame 300 of FIG. 3.

FIG. 5A shows an example of the new information element 500A, according to embodiments of the disclosure. The new information element 500A may include an element identity (ID) field 510A, which has a value (e.g., DUAL FCSs) to indicate that an MAC frame with two FCSs (such as, the video content specific MAC frame 200 of FIG. 2) is supported. The new information element 500A may also include a length field 520A and a flag field 530A. The length field 520A may indicate a number of bytes of the flag field 530A. The flag field 530A may be used to identify whether the MAC frame with two FCSs (such as, the video content specific MAC frame 200 of FIG. 2) is supported. The flag field 530A may have a value of 1 or 0.

FIG. 5B shows another example of the new information element 500B, according to embodiments of the disclosure. The new information element 500B may include an element ID field 510B, which has a value (e.g., TRIPLE FCSs) to indicate that an MAC frame with three FCSs (such as, the video content specific MAC frame 300 of FIG. 3) is supported. The new information element 500B may also include a length field 520B and a flag field 530B. The length field 520B may indicate a number of bytes of the flag field 530B. The flag field 530B may be used to identify whether the MAC frame with three FCSs (such as, the video content specific MAC frame 300 of FIG. 3) is supported. The flag field 530B may have a value of 1 or 0.

After the initial association establishment process, one of the Wi-Fi devices 420 (which may be considered as the "transmitter") may would like to transmit content (which may be video content or any other content) to one or more other Wi-Fi devices 420 (which may be considered as the "receiver(s)"), spontaneously or as required.

The transmitter may encode an MAC frame to carry the content to be transmitted, and encapsulate the MAC frame into a physical (PHY) frame. In an embodiment, the MAC frame may be the original MAC frame 100 of FIG. 1, the video content specific MAC frame 200 of FIG. 2, or the video content specific MAC frame 300 of FIG. 3.

In an embodiment, the PHY frame may include an additional byte in its high-efficiency signal-A (HE-SIG-A) field to notify the receiver(s) whether the MAC frame is encoded as an original MAC frame (such as, the original MAC frame 100 of FIG. 1) or a video content specific MAC frame (such as, the video content specific MAC frame 200 of FIG. 2 or the video content specific MAC frame 300 of FIG. 3). FIG. 6A shows an example of the extended HE-SIG-A field 600A, according to embodiments of the disclosure. As shown, the extended HE-SIG-A field 600A includes an original HE-SIG-A 610A and the additional byte 620A. For example, the additional byte 620A may be assigned a value of zero, to indicate that the MAC frame is encoded as the original MAC frame. For example, the additional byte 620A may be assigned a value of non-zero to indicate that the MAC frame is encoded as the video content specific MAC frame. The non-zero value (e.g., 1~255) may be used to identify where the video content starts in the MAC frame. That is to say, the non-zero value means a number of bytes from the beginning of the MAC frame (i.e., the beginning of the MAC header) to the end of the first FCS.

In another embodiment, when the MAC frame is encoded as the video content specific MAC frame 300 of FIG. 3, in which the MAC header, first MAC frame body and first FCS are duplicated. In that case, the PHY frame may further include an indication (for example, in another additional byte) to indicate that the MAC header, first MAC frame body and first FCS have been duplicated. FIG. 6B shows another example of the extended HE-SIG-A field 600B, according to embodiments of the disclosure. As shown, the extended HE-SIG-A field 600B includes an original HE-SIG-A 610B, an additional byte 620B, and a duplication indication 630B.

The original HE-SIG-A 610B may be the same as the original HE-SIG-A 610A.

The duplication indication 630B, when has a value of 1, for example, may indicate that the MAC header, first MAC frame body and first FCS of the video content specific MAC frame has been duplicated. The receiver(s) may then determine that the MAC frame is encoded in the format of the video content specific MAC frame 300.

Similarly as the additional byte 620A of FIG. 6A, the additional byte 620B, when has a value of zero, may indicate that the MAC frame is encoded as the original MAC frame 100. Alternatively, the additional byte 620B when has a non-zero value, may indicate that the MAC frame is encoded as the video content specific MAC frame 200/300.

When the duplication indication 630B indicates that the MAC frame is encoded in the format of the video content specific MAC frame 300, the non-zero value of the additional byte 620B still means a number of bytes from the beginning of the MAC frame (i.e., the beginning of the MAC header 210 of FIG. 3) to the end of the first FCS (i.e., the FCS1 230 of FIG. 3), other than the end of the duplicated first FCS (i.e., the duplicated FCS1 330), since the length from the beginning of the MAC frame to the end of the duplicated first FCS may exceed a range of value that can be expressed using one byte, i.e., 1-255. However, the non-zero value can still notify the receiver(s) where the video content starts in the MAC frame, since the length from the beginning of the MAC header 210 to the end of the first FCS 230 are the same as that from the beginning of the duplicated MAC header 310 to the end of the duplicated first FCS 330, and the receiver(s) may know that the MAC header, first MAC frame body and first FCS has been duplicated from the duplication indication 630B, and will double the value to obtain the position where the video content starts in the MAC frame.

The transmitter may then transmit the PHY frame as a bit stream, via its Radio Frequency (RF) transceiver.

When one of the receiver(s) receives the bit stream, the receiver may process the bit stream to obtain the PHY frame including an extended HE-SIG-A field, such as, the extended HE-SIG-A field 600A. The receiver may check the extended HE-SIG-A field 600A to find whether an MAC frame encapsulated in the PHY frame is encoded in the format of an original MAC frame (such as, the original MAC frame 100 of FIG. 1) or a video content specific MAC frame (such as, the video content specific MAC frame 200 of FIG. 2). As mentioned, when the additional byte 620A of the extended HE-SIG-A field 600A has a value of zero, the receiver may determine that the MAC frame is encoded as the original MAC frame and then verify the FCS of the original MAC frame; if no error is detected during the verification, the receiver would send an acknowledgement (ACK) to the transmitter; or if any unrecoverable error is detected during the verification, the receiver would require retransmission from the transmitter.

When the additional byte 620A of the extended HE-SIG-A field 600A has a non-zero value, the receiver may determine that the MAC frame is encoded as the video content specific MAC frame, which has the first FCS for verifying the protocol information and the second FCS for verifying the encoded video content. In that case, the receiver may verify the first FCS firstly; if the verification of the first FCS detects any unrecoverable error, the receiver would require retransmission from the transmitter, or otherwise, the receiver would verify the second FCS. If no error is detected or a number of detected error bits is below a predefined threshold during the verification of the second FCS, the receiver would send an ACK to the transmitter, or if the number of error bits detected during the verification of the second FCS exceeds the predefined threshold, the receiver would require retransmission from the transmitter.

In an embodiment, the verification of the first FCS and the verification of the second FCS may happen sequentially, and if the verification of the first FCS detects any unrecoverable error, the receiver would refrain from verifying the second FCS and require retransmission from the transmitter. In another embodiment, the verification of the first FCS and the verification of the second FCS may happen simultaneously, and the receiver would send an ACK to the transmitter, if the retransmission is not required after the verification of the first FCS and the verification of the second FCS.

As such, for the video content specific MAC frame, a probability for retransmission may be decreased significantly.

The case that the PHY frame includes the extended HE-SIG-A field 600B is discussed below. As mentioned, the receiver may check the additional byte 620B of the extended HE-SIG-A field 600B to find whether an MAC frame encapsulated in the PHY frame is encoded as an original MAC frame (such as, the original MAC frame 100 of FIG. 1) or a video content specific MAC frame (such as, the video content specific MAC frame 200 of FIG. 2 or the video content specific MAC frame 300 of FIG. 3). When the additional byte 620B of the extended HE-SIG-A field 600B has a value of zero, the receiver may determine that the MAC frame is encoded as the original MAC frame. The process for the original MAC frame 100 has been detailed above, which will not be repeated herein. When the additional byte 620B of the extended HE-SIG-A field 600B has a non-zero value, the receiver may determine that the MAC frame is encoded as the video content specific MAC frame. The receiver would further check the duplication indication 630B to find whether the protocol information and the first FCS have been duplicated. If not, the MAC frame is encoded as the video content specific MAC frame 200 of FIG. 2. The process for the video content specific MAC frame 200 has been detailed above, which will not be repeated herein. If the receiver finds that the protocol information and the first FCS have been duplicated, it will determine that the MAC frame is encoded as the video content specific MAC frame 300 of FIG. 3, which includes the MAC header 210, first frame body 220 and first FCS 230, duplicated MAC header 310, duplicated first frame body 320 and duplicated first FCS 330, second frame body 240 and second FCS 250. In that case, the receiver may verify the first FCS firstly. If the first FCS 230 is valid, the receiver would use the MAC header 210 and first frame body 220, and discard the duplicated MAC header 310 and duplicated first frame body 320; or otherwise, if the first FCS 230 is invalid, the receiver would then verify the duplicated first FCS 330. If the duplicated first FCS 330 is valid, the receiver would then use the duplicated MAC header 310, duplicated first frame body 320 and duplicated first FCS 330, and discard the MAC header 210, first frame body 220 and first FCS 230; or otherwise, if the duplicated first FCS 330 is also invalid, the receiver would require retransmission from the transmitter. When any of the first FCS 230 or the duplicated first FCS 330 is valid, the receiver would proceed to verify the second FCS 250. The verification of the second FCS 250 is the same as above, which will not be repeated herein.

Figure 7:
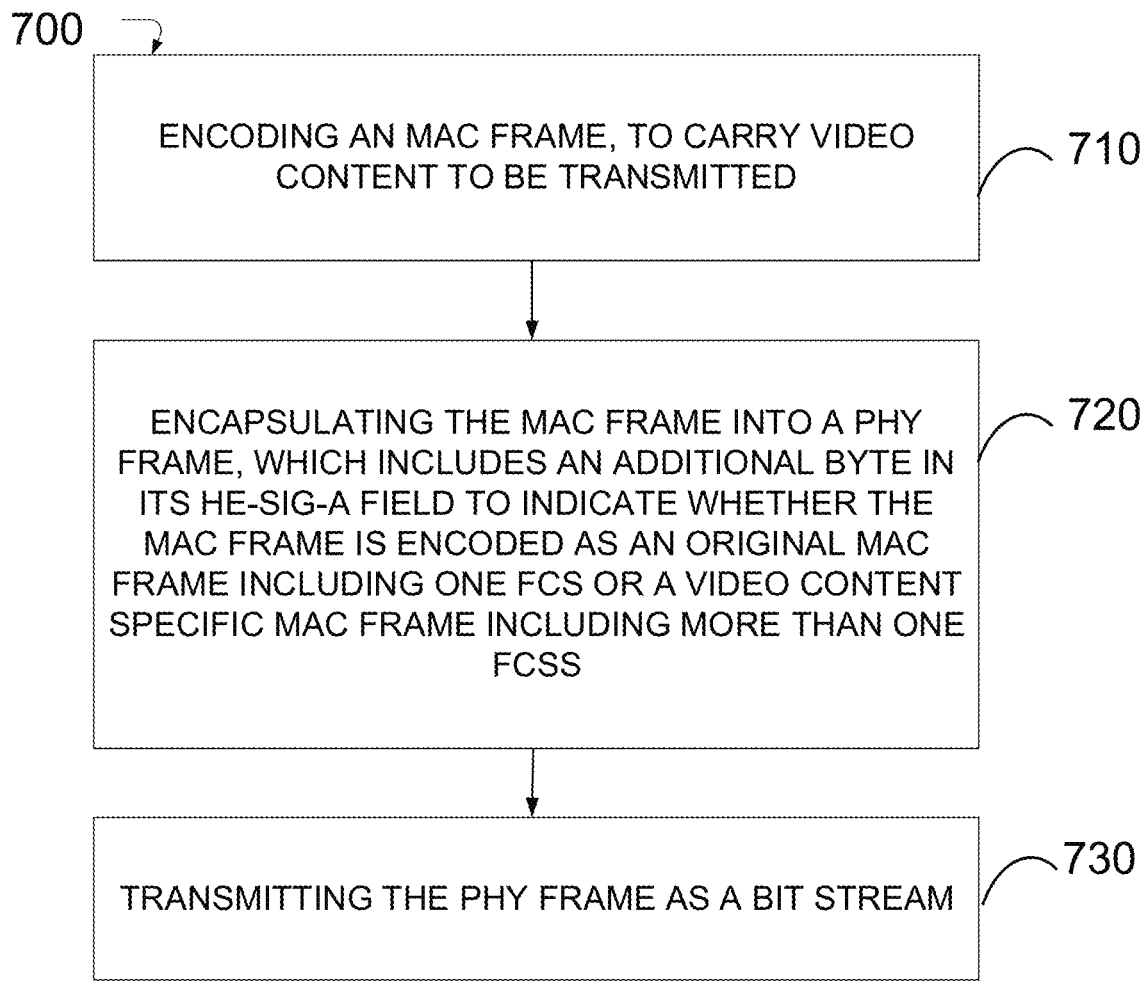
FIG. 7 is a flowchart showing a process performed by a Wi-Fi device, according to embodiments of the disclosure.

FIG. 7 is a flowchart showing a process 700 performed by a Wi-Fi device, according to embodiments of the disclosure. The process 700 may be implemented by any of the Wi-Fi devices 420 described herein with reference to FIG. 4.

The process 700 may include encoding an MAC frame, to carry video content to be transmitted to one or more other Wi-Fi devices connected with the Wi-Fi device, at block 710. The process 700 may further include encapsulating the MAC frame into a PHY frame, at block 720. The PHY frame may include an additional byte in its HE-SIG-A field (as shown in FIG. 6A and FIG. 6B), to indicate whether the MAC frame is encoded as an original MAC frame including one FCS, such as, the original MAC frame 100 of FIG. 1, or a video content specific MAC frame including more than one FCSs, such as, the video content specific MAC frame 200 of FIG. 2 or the video content specific MAC frame 300 of FIG. 3.

The process 700 may further include transmitting the PHY frame as a bit stream to the one or more other Wi-Fi devices, at block 730.

Figure 8:
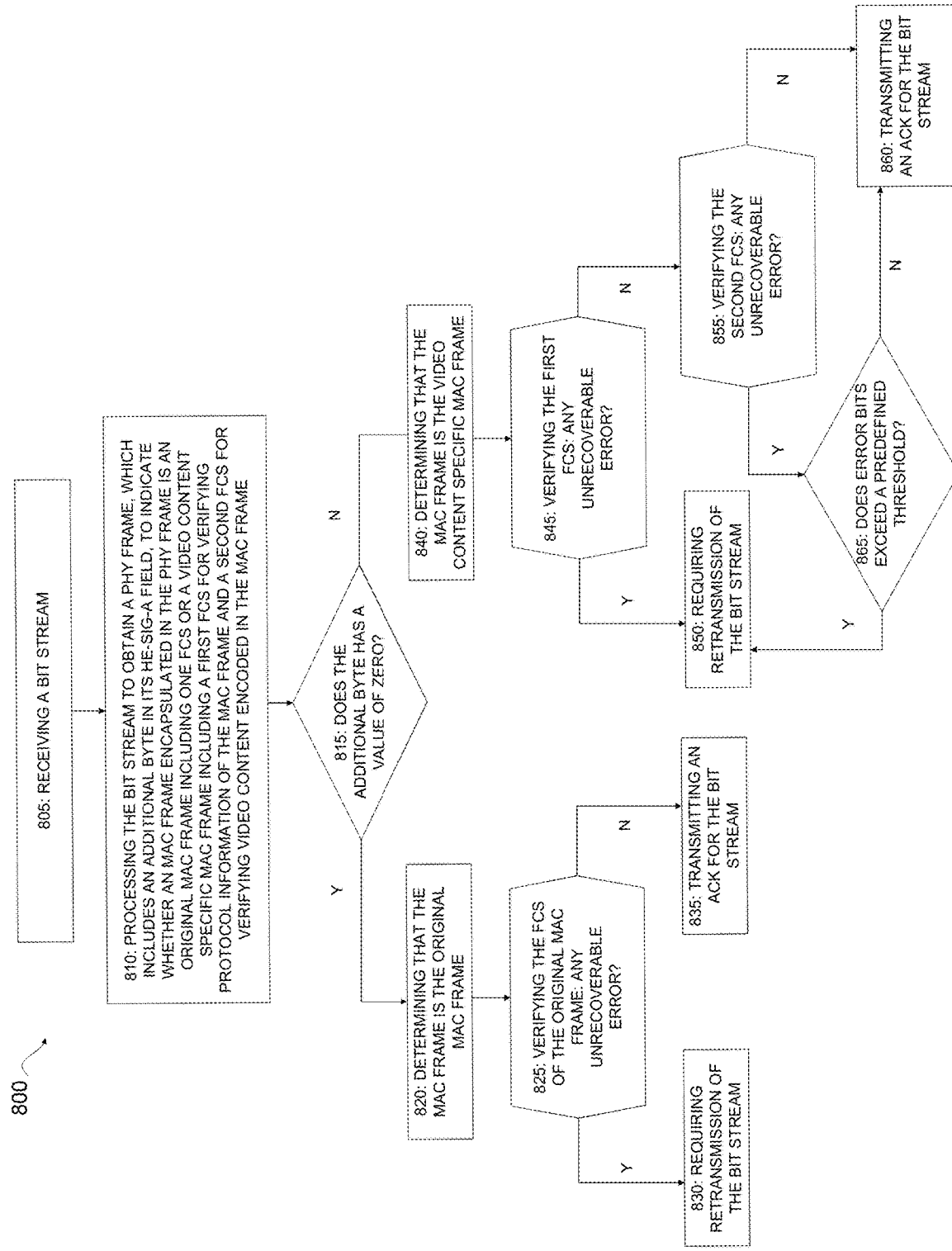
FIG. 8 is a flowchart showing a process performed by a Wi-Fi device, according to embodiments of the disclosure.

FIG. 8 is a flowchart showing a process 800 performed by a Wi-Fi device, according to embodiments of the disclosure. The process 800 may be implemented by any of the Wi-Fi devices 420 described herein with reference to FIG. 4.

The process 800 may include receiving a bit stream, transmitted from another Wi-Fi device connected with the Wi-Fi device, at block 805.

The process 800 may include processing the bit stream to obtain a PHY frame, at block 810. The PHY frame includes an additional byte in its HE-SIG-A field, which indicates whether an MAC frame encapsulated in the PHY frame is an original MAC frame including one FCS or a video content specific MAC frame including a first FCS for verifying protocol information of the MAC frame and a second FCS for verifying video content encoded in the MAC frame.

The process 800 may include checking whether the additional byte has a value of zero, at block 815. If so, the process 800 proceeds to block 820, to determine that the MAC frame is the original MAC frame including one FCS. The process 800 may include, at block 825, verifying the FCS of the original MAC frame. If the verification of the FCS at block 825 detects any unrecoverable error, the process 800 proceeds to block 830 to require retransmission of the bit stream. If the verification of the FCS at block 825 does not detect any unrecoverable error, the process 800 proceeds to block 835 to transmit an ACK for the bit stream to the other Wi-Fi device.

Back to block 815, if the additional byte does not have the value of zero, the process 800 proceeds to block 840, to determine that the MAC frame is the video content specific MAC frame. The process 800 may include, at block 845, verifying the first FCS. If the verification of the first FCS at block 845 detects any unrecoverable error, the process 800 proceeds to block 850 to require retransmission of the bit stream. If the verification of the first FCS at block 845 does not detect any unrecoverable error, the process 800 proceeds to block 855 to verify the second FCS. If the verification of the second FCS at block 855 does not detect any unrecoverable error, the process 800 proceeds to block 860 to transmit an ACK for the bit stream to the other Wi-Fi device. If the verification of the second FCS at block 855 detects error bits, the process 800 proceeds to block 865 to determine whether a number of the error bits exceeds a predefined threshold. If it is determined at block 865 that the number of the error bits does not exceed the predefined threshold, the process 800 proceeds to block 860 to transmit the ACK for the bit stream to the other Wi-Fi device. If it is determined at block 865 that the number of the error bits exceeds the predefined threshold, the process 800 proceeds to block 850 to require retransmission of the bit stream.

Figure 9:
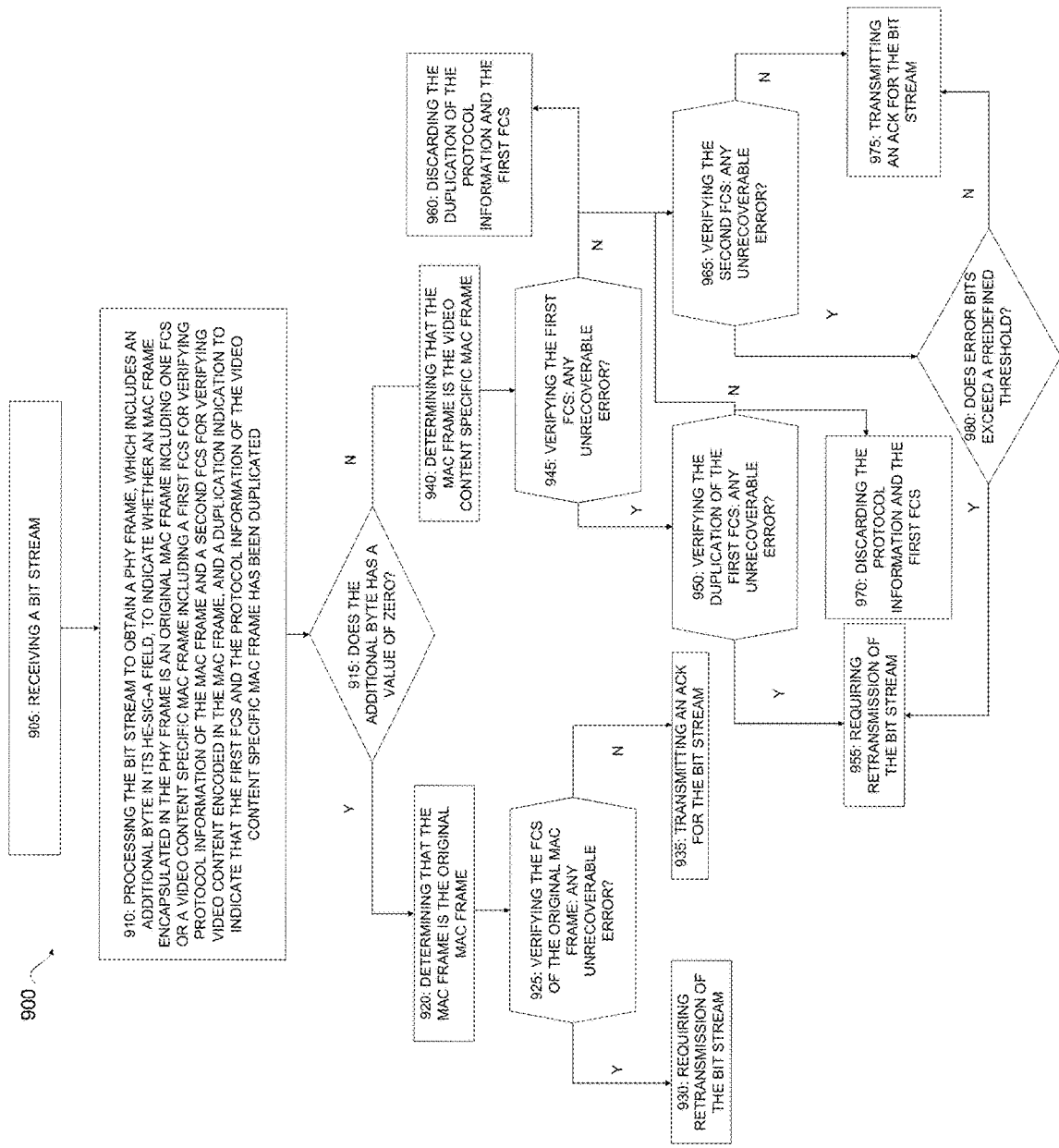
FIG. 9 is a flowchart showing a process performed by a Wi-Fi device, according to embodiments of the disclosure.

FIG. 9 is a flowchart showing a process 900 performed by a Wi-Fi device, according to embodiments of the disclosure. The process 900 may be implemented by any of the Wi-Fi devices 420 described herein with reference to FIG. 4.

The process 900 may include receiving a bit stream, transmitted from another Wi-Fi device connected with the Wi-Fi device, at block 905.

The process 900 may include processing the bit stream to obtain a PHY frame, at block 910. The PHY frame includes an additional byte in its HE-SIG-A field, which indicates whether an MAC frame encapsulated in the PHY frame is an original MAC frame including one FCS or a video content specific MAC frame including a first FCS for verifying protocol information of the MAC frame and a second FCS for verifying video content encoded in the MAC frame; and a duplication indication to indicate that the first FCS and the protocol information of the video content specific MAC frame has been duplicated.

Blocks 915-945 are the same as blocks 815-845 of the process 800 of FIG. 8, and will not be described repeatedly. If the verification of the first FCS at block 945 detects any unrecoverable error, the process 900 proceeds to block 950, to verify the duplication of the first FCS. If the verification of the duplication of the first FCS at block 950 also detects any unrecoverable error, the process 900 proceeds to block 955, to require retransmission of the bit stream.

If the verification of the first FCS at block 945 does not detect any unrecoverable error, the process 900 proceeds to block 960, to discard the duplication of the protocol information and first FCS, and to block 965, to verify the second FCS.

If the verification of the duplication of the first FCS at block 950 does not detect any unrecoverable error, the process 900 proceeds to block 970, to discard the protocol information and first FCS, and to block 965, to verify the second FCS.

If the verification of the second FCS at block 965 does not detect any unrecoverable error, the process 900 proceeds to block 975 to transmit an ACK for the bit stream to the other Wi-Fi device. If the verification of the second FCS at block 965 detects error bits, the process 900 proceeds to block 980 to determine whether a number of the error bits exceeds a predefined threshold. If it is determined at block 980 that the number of the error bits does not exceed the predefined threshold, the process 900 proceeds to block 975 to transmit the ACK for the bit stream to the other Wi-Fi device. If it is determined at block 980 that the number of the error bits exceeds the predefined threshold, the process 900 proceeds to block 955 to require retransmission of the bit stream.

More particularly, each of the process 700 of FIG. 7, process 800 of FIG. 9, and process 900 of FIG. 9 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in each of process 700 of FIG. 7, process 800 of FIG. 9, and process 900 of FIG. 9 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 10:
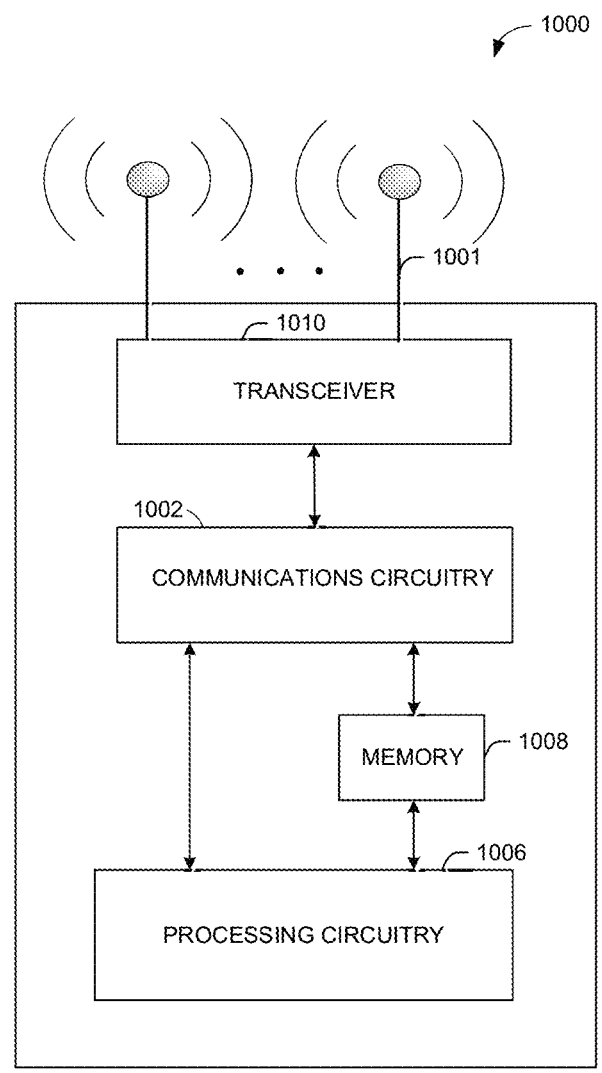
FIG. 10 shows a functional diagram of an exemplary communication device, according to embodiments of the disclosure.

FIG. 10 shows a functional diagram of an exemplary communication device 1000, in accordance with embodiments of the disclosure. In one embodiment, FIG. 10 illustrates a functional block diagram of a communication device that may be suitable for use as the AP(s) 410 (FIG. 4) or the Wi-Fi device(s) 420 (FIG. 4) in accordance with some embodiments. The communication device 1000 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication device 1000 may include communications circuitry 1002 and a transceiver 1010 for transmitting and receiving signals to and from other communication devices using one or more antennas 1001. The communications circuitry 1002 may include circuitry that can operate the physical layer (PHY) communications and/or medium access control (MAC) communications for controlling access to the wireless medium, and/or any other communications layers for transmitting and receiving signals. The communication device 1000 may also include processing circuitry 1006 and memory 1008 arranged to perform the operations described herein. In some embodiments, the communications circuitry 1002 and the processing circuitry 1006 may be configured to perform operations detailed in the above figures, diagrams, and flows.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc.

The processing circuitry 1006 may be coupled to the communications circuitry 1002 or transceiver 1010 by a RF interface (not shown) to transmit or receive data to and from other communication devices using the RF antennas 1001. In some embodiments, the processing circuitry 1006 of the communication device 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device, read-only memory (ROM), random-access memory (RAM), magnetic disk storage media, optical storage media, flash-memory devices and other storage devices and media.

In some embodiments, the communication device 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication device 1000 may include one or more of a keyboard, a display, a non-volatile memory port, multiple antennas, a graphics processor, an application processor, speakers, and other mobile device elements. The display may be an LCD screen including a touch screen.

Although the communication device 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication device 1000 may include one or more processors and may be configured with instructions stored on a computer-readable storage device.

Figure 11:
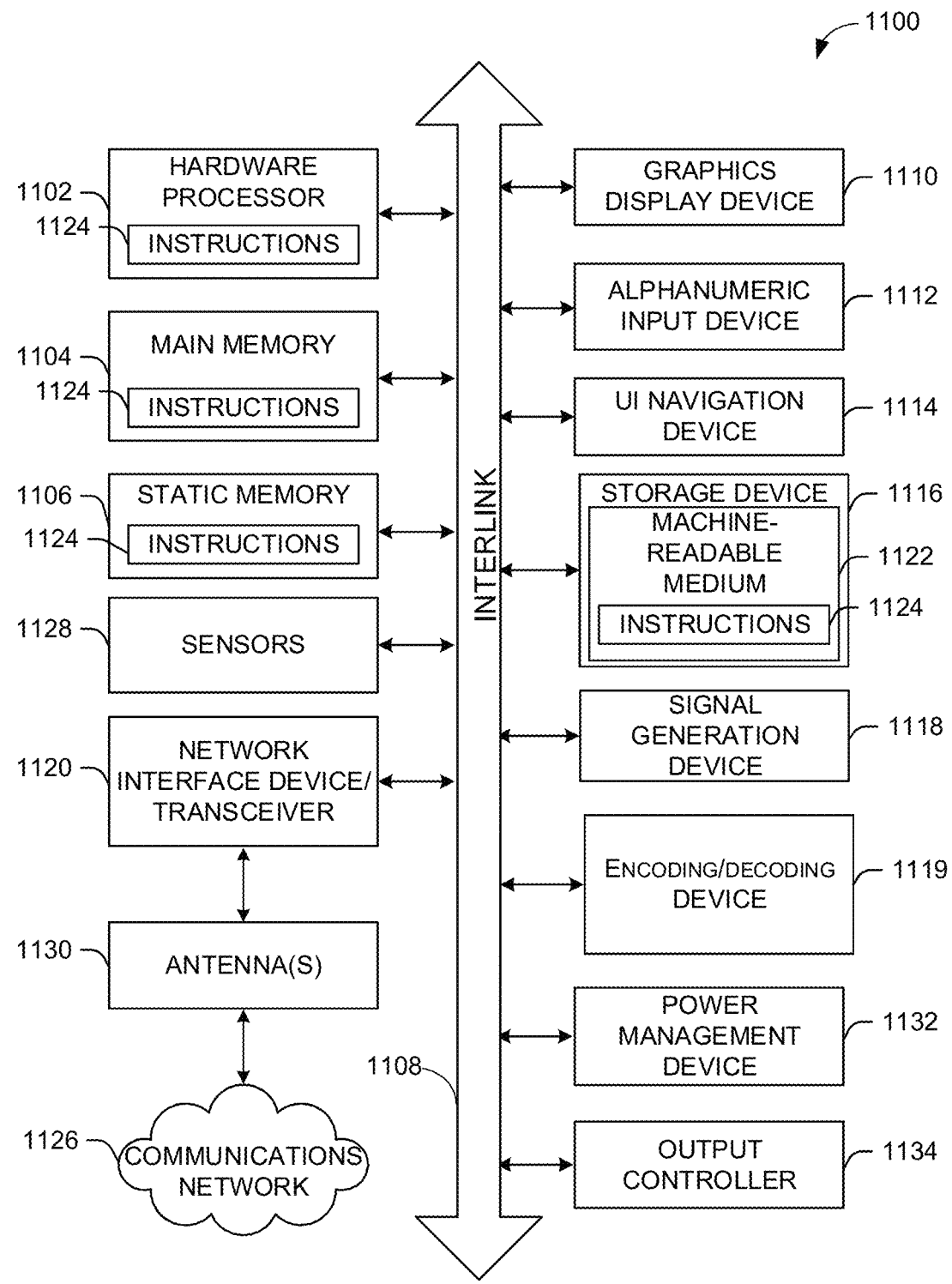
FIG. 11 shows a block diagram of an example of a machine or system upon which any one or more of the techniques discussed herein may be performed.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (e.g., drive unit) 1116, a signal generation device 1118 (e.g., a speaker), a encoding/decoding device 1119, a network interface device/transceiver 1120 coupled to antenna(s) 1130, and one or more sensors 1128, such as a global positioning system (GPS) sensor, a compass, an accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1102 for generation and processing of the baseband signals and for controlling operations of the main memory 1104, the storage device 1116, and/or the encoding/decoding device 1119. The baseband processor may be provided on a single radio card, a single chip, or an integrated circuit (IC).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The encoding/decoding device 1119 may carry out or perform any of the operations and processes (e.g., processes 700, 800 and 900) described and shown above.

It is understood that the above are only a subset of what the signaling operation info and encoding/decoding device 1119 may be configured to perform and that other functions included throughout this disclosure may also be performed by the encoding/decoding device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 12:
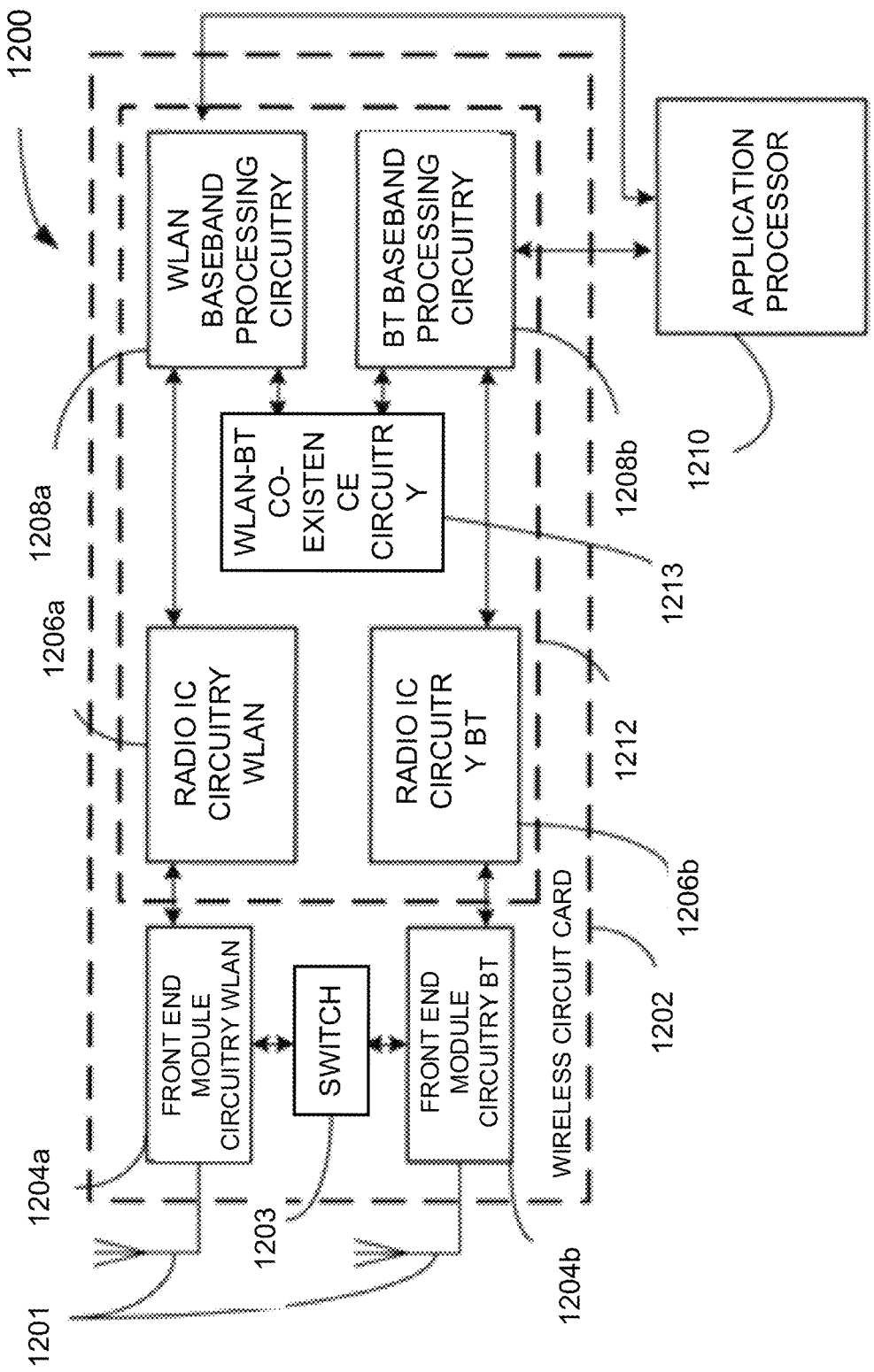
FIG. 12 is a block diagram of a radio architecture, according to embodiments of the disclosure.

FIG. 12 is a block diagram of a radio architecture 1200 in accordance with some embodiments that may be implemented in any Wi-Fi device described above. Radio architecture 1200 may include radio front-end module (FEM) circuitry 1204a-b, radio IC circuitry 1206a-b and baseband processing circuitry 1208a-b. Radio architecture 1200 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1204a-b may include a WLAN or Wi-Fi FEM circuitry 1204a and a Bluetooth (BT) FEM circuitry 1204b. The WLAN FEM circuitry 1204a may include a receive signal path comprising circuitry configured to operate on WLAN RF signals received from one or more antennas 1201, to amplify the received signals and to provide the amplified versions of the received signals to the WLAN radio IC circuitry 1206a for further processing. The BT FEM circuitry 1204b may include a receive signal path which may include circuitry configured to operate on BT RF signals received from one or more antennas 1201, to amplify the received signals and to provide the amplified versions of the received signals to the BT radio IC circuitry 1206b for further processing. FEM circuitry 1204a may also include a transmit signal path which may include circuitry configured to amplify WLAN signals provided by the radio IC circuitry 1206a for wireless transmission by one or more of the antennas 1201. In addition, FEM circuitry 1204b may also include a transmit signal path which may include circuitry configured to amplify BT signals provided by the radio IC circuitry 1206b for wireless transmission by the one or more antennas. In the embodiment of FIG. 12, although FEM 1204a and FEM 1204b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1206a-b as shown may include WLAN radio IC circuitry 1206a and BT radio IC circuitry 1206b. The WLAN radio IC circuitry 1206a may include a receive signal path which may include circuitry to down-convert WLAN RF signals received from the FEM circuitry 1204a and provide baseband signals to WLAN baseband processing circuitry 1208a. BT radio IC circuitry 1206b may in turn include a receive signal path which may include circuitry to down-convert BT RF signals received from the FEM circuitry 1204b and provide baseband signals to BT baseband processing circuitry 1208b. WLAN radio IC circuitry 1206a may also include a transmit signal path which may include circuitry to up-convert WLAN baseband signals provided by the WLAN baseband processing circuitry 1208a and provide WLAN RF output signals to the FEM circuitry 1204a for subsequent wireless transmission by the one or more antennas 1201. BT radio IC circuitry 1206b may also include a transmit signal path which may include circuitry to up-convert BT baseband signals provided by the BT baseband processing circuitry 1208b and provide BT RF output signals to the FEM circuitry 1204b for subsequent wireless transmission by the one or more antennas 1201. In the embodiment of FIG. 12, although radio IC circuitries 1206a and 1206b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1208a-b may include a WLAN baseband processing circuitry 1208a and a BT baseband processing circuitry 1208b. The WLAN baseband processing circuitry 1208a may include a memory, such as, for example, a set of RAM arrays in a Fast Fourier Transform or Inverse Fast Fourier Transform block (not shown) of the WLAN baseband processing circuitry 1208a. Each of the WLAN baseband circuitry 1208a and the BT baseband circuitry 1208b may further include one or more processors and control logic to process the signals received from the corresponding WLAN or BT receive signal path of the radio IC circuitry 1206a-b, and to also generate corresponding WLAN or BT baseband signals for the transmit signal path of the radio IC circuitry 1206a-b. Each of the baseband processing circuitries 1208a and 1208b may further include physical layer (PHY) and medium access control layer (MAC) circuitry, and may further interface with a device for generation and processing of the baseband signals and for controlling operations of the radio IC circuitry 1206a-b.

Referring still to FIG. 12, according to the shown embodiment, WLAN-BT coexistence circuitry 1213 may include logic providing an interface between the WLAN baseband circuitry 1208a and the BT baseband circuitry 1208b to enable use cases requiring WLAN and BT coexistence. In addition, a switch 1203 may be provided between the WLAN FEM circuitry 1204a and the BT FEM circuitry 1204b to allow switching between the WLAN and BT radios according to application needs. In addition, although the antennas 1201 are depicted as being respectively connected to the WLAN FEM circuitry 1204a and the BT FEM circuitry 1204b, embodiments include within their scope the sharing of one or more antennas as between the WLAN and BT FEMs, or the provision of more than one antenna connected to each of FEM 1204a or 1204b.

In some embodiments, the front-end module circuitry 1204a-b, the radio IC circuitry 1206a-b, and baseband processing circuitry 1208a-b may be provided on a single radio card, such as wireless radio card 1202. In some other embodiments, the one or more antennas 1201, the FEM circuitry 1204a-b and the radio IC circuitry 1206a-b may be provided on a single radio card. In some other embodiments, the radio IC circuitry 1206a-b and the baseband processing circuitry 1208a-b may be provided on a single chip or integrated circuit (IC), such as IC 1212.

In some embodiments, the wireless radio card 1202 may include a WLAN radio card and may be configured for Wi-Fi communications, although the scope of the embodiments is not limited in this respect. In some of these embodiments, the radio architecture 1200 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1200 may be part of a Wi-Fi communication device (STA) such as a wireless access point (AP), a base station or a mobile device. In some of these embodiments, radio architecture 1200 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay, 802.11ax and/or 802.11be standards and/or proposed specifications for WLANs, although the scope of embodiments is not limited in this respect. Radio architecture 1200 may also be suitable to transmit and/or receive communications in accordance with other techniques and standards.

In some embodiments, the radio architecture 1200 may be configured for high-efficiency Wi-Fi (HEW) communications in accordance with the IEEE 802.11ax standard or extremely high throughput Wi-Fi (Wi-Fi EHT) communications in accordance with the IEEE 802.11be standard. In these embodiments, the radio architecture 1200 may be configured to communicate in accordance with an OFDMA technique, although the scope of the embodiments is not limited in this respect.

In some other embodiments, the radio architecture 1200 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 12, the BT baseband circuitry 1208b may be compliant with a Bluetooth (BT) connectivity standard such as Bluetooth, Bluetooth 8.0 or Bluetooth 6.0, or any other iteration of the Bluetooth Standard.

In some embodiments, the radio architecture 1200 may include other radio cards, such as a cellular radio card configured for cellular (e.g., 3GPP such as LTE, LTE-Advanced or 5G communications).

In some IEEE 802.11 embodiments, the radio architecture 1200 may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 13:
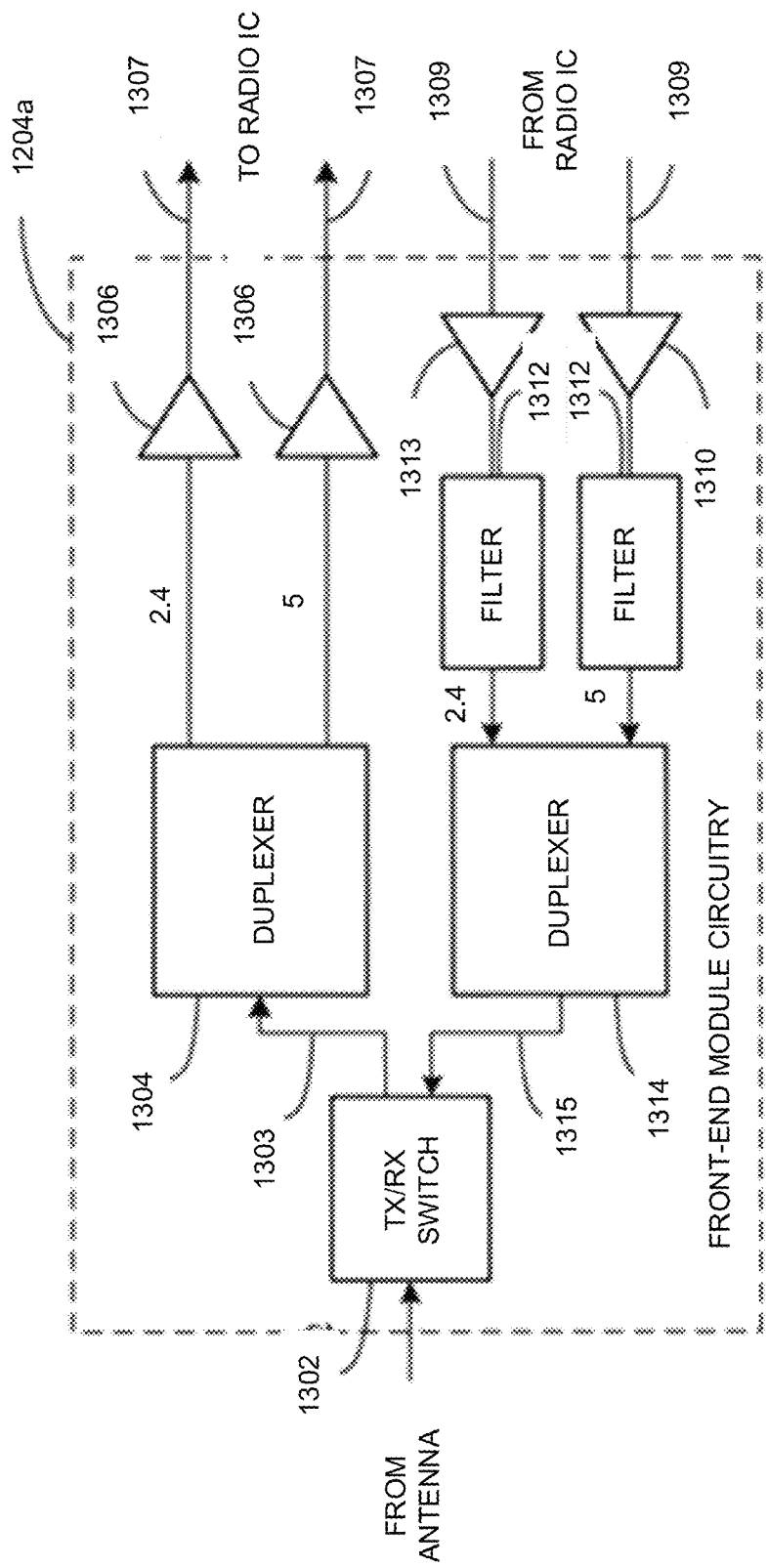
FIG. 13 is a functional block diagram illustrating the WLAN FEM circuitry of FIG. 12.

FIG. 13 illustrates WLAN FEM circuitry 1204a in accordance with some embodiments. Although the example of FIG. 13 is described in conjunction with the WLAN FEM circuitry 1204a, the example of FIG. 13 may be described in conjunction with the example BT FEM circuitry 1204b (FIG. 12), although other circuitry configurations may also be suitable.

In some embodiments, the FEM circuitry 1204a may include a TX/RX switch 1302 to switch between transmit mode and receive mode operation. The FEM circuitry 1204a may include a receive signal path and a transmit signal path. The receive signal path of the FEM circuitry 1204a may include a low-noise amplifier (LNA) 1306 to amplify received RF signals 1303 and provide the amplified received RF signals 1307 as an output (e.g., to the radio IC circuitry 1206a-b (FIG. 12)). The transmit signal path of the circuitry

1204a may include a power amplifier (PA) to amplify input RF signals 1309 (e.g., provided by the radio IC circuitry 1206a-b), and one or more filters 1312, such as band-pass filters (BPFs), low-pass filters (LPFs) or other types of filters, to generate RF signals 1315 for subsequent transmission (e.g., by one or more of the antennas 1201 (FIG. 12)) via an example duplexer 1314.

In some dual-mode embodiments for Wi-Fi communication, the FEM circuitry 1204a may be configured to operate in either the 2.4 GHz frequency spectrum or the 5 GHz frequency spectrum. In these embodiments, the receive signal path of the FEM circuitry 1204a may include a receive signal path duplexer 1304 to separate the signals from each spectrum as well as provide a separate LNA 1306 for each spectrum as shown. In these embodiments, the transmit signal path of the FEM circuitry 1204a may also include a power amplifier 1310 and a filter 1312, such as a BPF, an LPF or another type of filter for each frequency spectrum and a transmit signal path duplexer 1304 to provide the signals of one of the different spectrums onto a single transmit path for subsequent transmission by the one or more of the antennas 1201 (FIG. 12). In some embodiments, BT communications may utilize the 2.4 GHz signal paths and may utilize the same FEM circuitry 1204a as the one used for WLAN communications.

Figure 14:
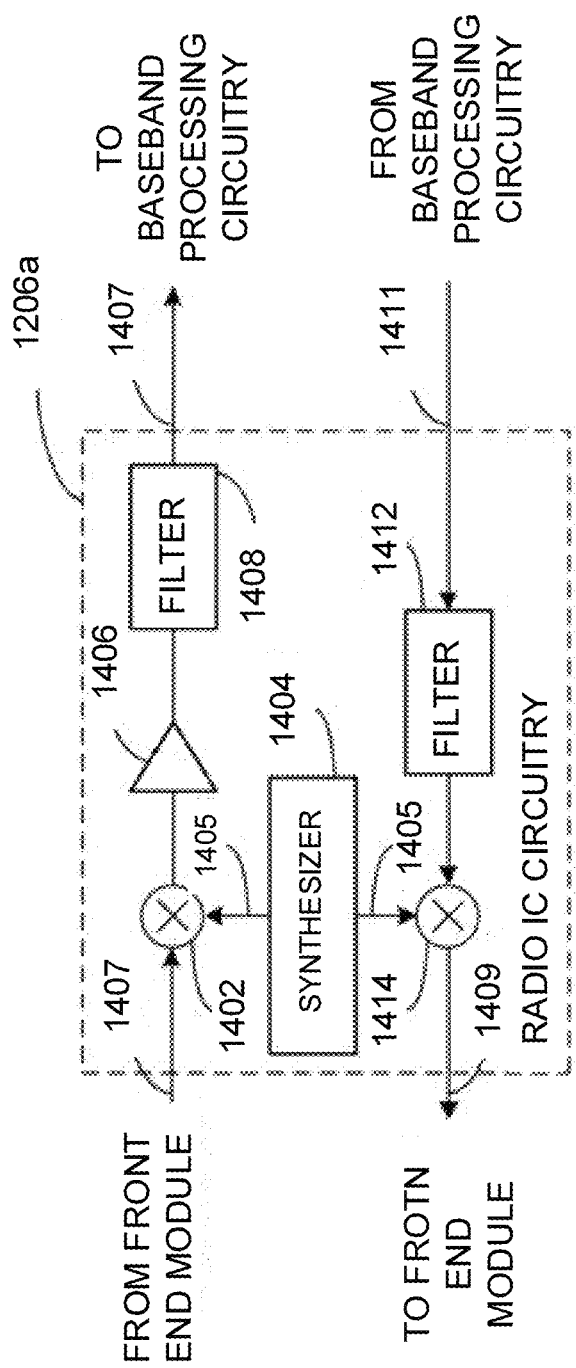
FIG. 14 is a functional block diagram illustrating the radio IC circuitry of FIG. 12.

FIG. 14 illustrates radio IC circuitry 1206a in accordance with some embodiments. The radio IC circuitry 1206a is one example of circuitry that may be suitable for use as the WLAN or BT radio IC circuitry 1206a/1206b (FIG. 12), although other circuitry configurations may also be suitable. Alternatively, the example of FIG. 14 may be described in conjunction with the example BT radio IC circuitry 1206b.

In some embodiments, the radio IC circuitry 1206a may include a receive signal path and a transmit signal path. The receive signal path of the radio IC circuitry 1206a may include at least mixer circuitry 1402, such as, for example, down-conversion mixer circuitry, amplifier circuitry 1406 and filter circuitry 1408. The transmit signal path of the radio IC circuitry 1206a may include at least filter circuitry 1412 and mixer circuitry 1414, such as, for example, up-conversion mixer circuitry. Radio IC circuitry 1206a may also include synthesizer circuitry 1404 for synthesizing a frequency 1405 for use by the mixer circuitry 1402 and the mixer circuitry 1414. The mixer circuitry 1402 and/or 1414 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 14 illustrates only a simplified version of a radio IC circuitry, and may include, although not shown, embodiments where each of the depicted circuitries may include more than one component. For instance, mixer circuitry 1414 may each include one or more mixers, and filter circuitries 1408 and/or 1412 may each include one or more filters, such as one or more BPFs and/or LPFs according to application needs. For example, when mixer circuitries are of the direct-conversion type, they may each include two or more mixers.

In some embodiments, mixer circuitry 1402 may be configured to down-convert RF signals 1307 received from the FEM circuitry 1204a-b (FIG. 12) based on the synthesized frequency 1405 provided by synthesizer circuitry 1404. The amplifier circuitry 1406 may be configured to amplify the down-converted signals and the filter circuitry 1408 may include an LPF configured to remove unwanted signals from the down-converted signals to generate output baseband signals 1407. Output baseband signals 1407 may be provided to the baseband processing circuitry 1208a-b (FIG. 12) for further processing. In some embodiments, the output baseband signals 1407 may be zero-frequency baseband signals, although this is not a requirement. In some embodiments, mixer circuitry 1402 may comprise passive mixers, although the scope of the embodiments is not limited in this respect.

In some embodiments, the mixer circuitry 1414 may be configured to up-convert input baseband signals 1411 based on the synthesized frequency 1405 provided by the synthesizer circuitry 1404 to generate RF output signals 1309 for the FEM circuitry 1204a-b. The baseband signals 1411 may be provided by the baseband processing circuitry 1208a-b and may be filtered by filter circuitry 1412. The filter circuitry 1412 may include an LPF or a BPF, although the scope of the embodiments is not limited in this respect.

In some embodiments, the mixer circuitry 1402 and the mixer circuitry 1414 may each include two or more mixers and may be arranged for quadrature down-conversion and/or up-conversion respectively with the help of synthesizer 1404. In some embodiments, the mixer circuitry 1402 and the mixer circuitry 1414 may each include two or more mixers each configured for image rejection (e.g., Hartley image rejection). In some embodiments, the mixer circuitry 1402 and the mixer circuitry 1414 may be arranged for direct down-conversion and/or direct up-conversion, respectively. In some embodiments, the mixer circuitry 1402 and the mixer circuitry 1414 may be configured for super-heterodyne operation, although this is not a requirement.

Mixer circuitry 1402 may comprise, according to one embodiment: quadrature passive mixers (e.g., for the in-phase (I) and quadrature phase (Q) paths). In such an embodiment, RF input signal 1307 from FIG. 14 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 1405 of synthesizer 1404 (FIG. 14). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1307 (FIG. 13) may comprise a balanced signal, although the scope of the embodiments is not limited in this respect. The I and Q baseband output signals may be provided to low-noise amplifier, such as amplifier circuitry 1406 (FIG. 14) or to filter circuitry 1408 (FIG. 14).

In some embodiments, the output baseband signals 1407 and the input baseband signals 1411 may be analog baseband signals, although the scope of the embodiments is not limited in this respect. In some alternate embodiments, the output baseband signals 1407 and the input baseband signals 1411 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1404 may be a fractional-N synthesizer or a fractional N/N+1 synthesizer, although the scope of the embodiments is not limited in this respect as other types of frequency synthesizers may be suitable. For example, synthesizer circuitry 1404 may be a delta-sigma synthesizer, a frequency multiplier, or a synthesizer comprising a phase-locked loop with a frequency divider. According to some embodiments, the synthesizer circuitry 1404 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1404 may be provided by a voltage controlled oscillator (VCO), although that is not a requirement. A divider control input may further be provided by either the baseband processing circuitry 1208*a-b* (FIG. 12) depending on the desired output frequency 1405. In some embodiments, a divider control input (e.g., N) may be determined from a look-up table (e.g., within a Wi-Fi card) based on a channel number and a channel center frequency as determined or indicated by the example application processor 1210.

In some embodiments, synthesizer circuitry 1404 may be configured to generate a carrier frequency as the output frequency 1405, while in other embodiments, the output frequency 1405 may be a fraction of the carrier frequency (e.g., one-half the carrier frequency, one-third the carrier frequency). In some embodiments, the output frequency 1405 may be a LO frequency ($f_{LO}$).

Figure 15:
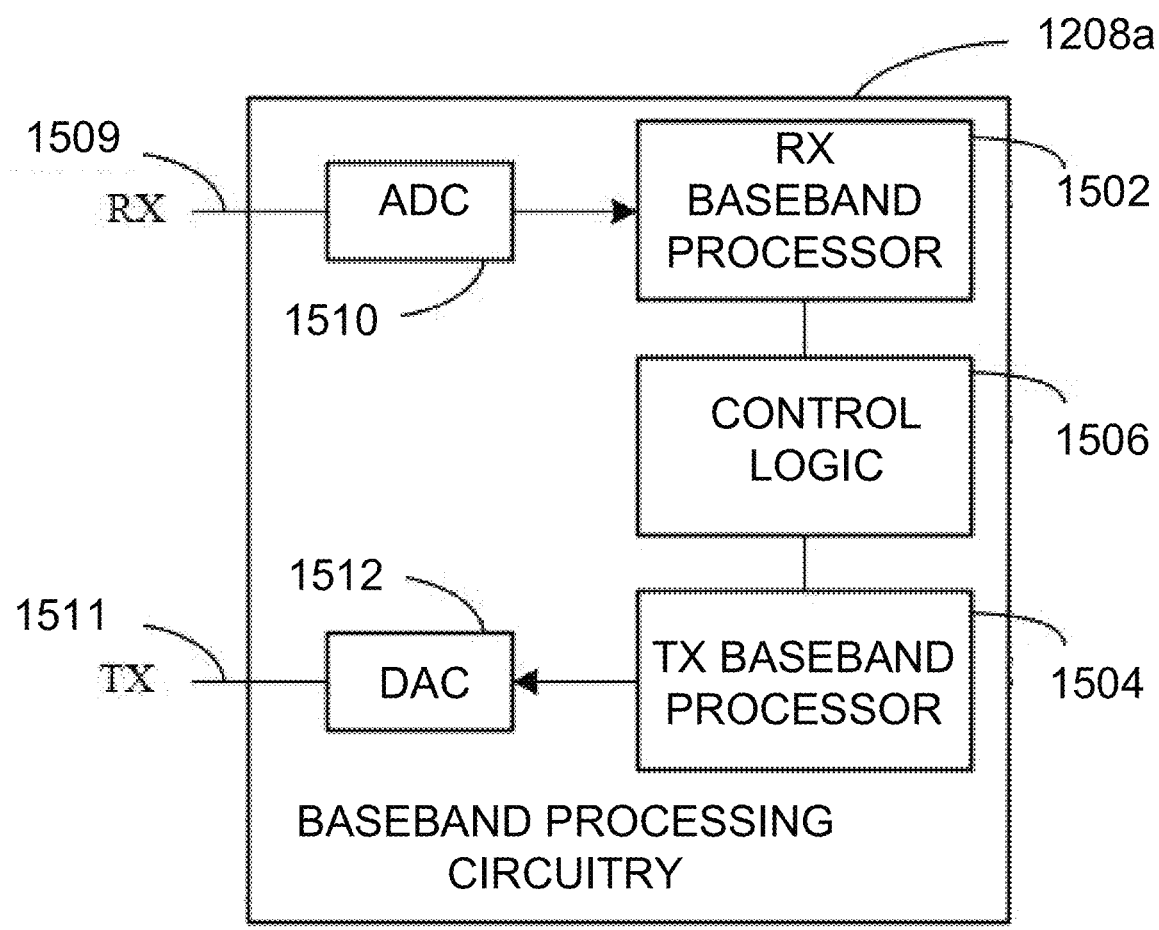
FIG. 15 is a functional block diagram illustrating the baseband processing circuitry of FIG. 12.

FIG. 15 illustrates a functional block diagram of baseband processing circuitry 1208*a* in accordance with some embodiments. The baseband processing circuitry 1208*a* is one example of circuitry that may be suitable for use as the baseband processing circuitry 1208*a* (FIG. 12), although other circuitry configurations may also be suitable. Alternatively, the example of FIG. 14 may be used to implement the example BT baseband processing circuitry 1208*b* of FIG. 12.

The baseband processing circuitry 1208*a* may include a receive baseband processor (RX BBP) 1502 for processing receive baseband signals 1409 provided by the radio IC circuitry 1206*a-b* (FIG. 12) and a transmit baseband processor (TX BBP) 1504 for generating transmit baseband signals 1411 for the radio IC circuitry 1206*a-b*. The baseband processing circuitry 1208*a* may also include control logic 1506 for coordinating the operations of the baseband processing circuitry 1208*a*.

In some embodiments (e.g., when analog baseband signals are exchanged between the baseband processing circuitry 1208*a-b* and the radio IC circuitry 1206*a-b*), the baseband processing circuitry 1208*a* may include ADC 1510 to convert analog baseband signals 1509 received from the radio IC circuitry 1206*a-b* to digital baseband signals for processing by the RX BBP 1502. In these embodiments, the baseband processing circuitry 1208*a* may also include DAC 1512 to convert digital baseband signals from the TX BBP 1504 to analog baseband signals 1511.

In some embodiments that communicate OFDM signals or OFDMA signals, such as through baseband processor 1208*a*, the transmit baseband processor 1504 may be configured to generate OFDM or OFDMA signals as appropriate for transmission by performing an inverse fast Fourier transform (IFFT). The receive baseband processor 1502 may be configured to process received OFDM signals or OFDMA signals by performing an FFT. In some embodiments, the receive baseband processor 1502 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 12, in some embodiments, the antennas 1201 (FIG. 12) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1201 may each include a set of phased-array antennas, although embodiments are not so limited.

Although the radio architecture 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following paragraphs describe examples of various embodiments.

Example 1 includes an apparatus for a Wireless Fidelity (Wi-Fi) device, the apparatus comprising: a Radio Frequency (RF) interface; and processing circuitry, coupled with the RF interface, the processing circuitry is to: encode a Medium Access Control (MAC) frame, to carry video content to be transmitted to one or more other Wi-Fi devices connected with the Wi-Fi device; encapsulate the MAC frame into a physical (PHY) frame, the PHY frame is to include an additional byte in a high-efficiency signal-A (HE-SIG-A) field, to indicate whether the MAC frame is encoded as an original MAC frame including one Frame Check Sequence (FCS) or a video content specific MAC frame including more than one FCSs; and transmit the PHY frame, via the RF interface, to the one or more other Wi-Fi devices.

Example 2 includes the apparatus of Example 1, wherein when the MAC frame is encoded as the original MAC frame, the processing circuitry is to assign a value of zero to the additional byte; and when the MAC frame is encoded as the video content specific MAC frame, the processing circuitry is to assign a value of non-zero to the additional byte.

Example 3 includes the apparatus of Example 2, wherein the more than one FCSs of the video content specific MAC frame includes a first FCS for verifying protocol information of the MAC frame and a second FCS for verifying the encoded video content.

Example 4 includes the apparatus of Example 3, wherein the non-zero value of the additional byte is assigned based on a length of the protocol information and the first FCS.

Example 5 includes the apparatus of Example 3, the processing circuitry is to encode the MAC frame to have the protocol information and the first FCS duplicated; and the PHY frame is to include a duplication indication in the HE-SIG-A field to indicate that the protocol information and the first FCS have been duplicated.

Example 6 includes the apparatus of Example 3, wherein the protocol information includes any of an MAC header, an Internet Protocol (IP) header, a Transmission Control Protocol (TCP) header, and a Real-time Transport Protocol (RTP)/Real Time Streaming Protocol (RTSP) header.

Example 7 includes the apparatus of any of Examples 1-6, wherein during initial association establishment of the Wi-Fi device with the one or more other Wi-Fi devices: the processing circuitry is to encode a beacon frame and an association request frame to be transmitted to each of the one or more other Wi-Fi devices to include a new information element to indicate whether the Wi-Fi device is able to deal with the video content specific MAC frame; and an association response frame received from each of the one or more other Wi-Fi devices is to include the new information element to indicate whether the Wi-Fi device is able to deal with the video content specific MAC frame.

Example 8 includes an apparatus for a Wireless Fidelity (Wi-Fi) device, the apparatus comprising: a Radio Frequency (RF) interface to receive a bit stream, transmitted from another Wi-Fi device connected with the Wi-Fi device; and processing circuitry, coupled with the RF interface, the processing circuitry is to process the bit stream to obtain a physical (PHY) frame, wherein the PHY frame includes information to indicate whether a Medium Access Control (MAC) frame encapsulated therein is an original MAC frame including one Frame Check Sequence (FCS) or a video content specific MAC frame including a first FCS for verifying protocol information of the MAC frame and a second FCS for verifying video content encoded in the MAC frame; and in case that the information in the PHY frame indicates that the MAC frame is the video content specific MAC frame, the processing circuitry is to require retransmission of the bit stream from the other Wi-Fi device, only when either of the following occurs: i) a verification of the first FCS detects an unrecoverable error; or ii) a number of error bits detected by a verification of the second FCS exceeds a predefined threshold.

Example 9 includes the apparatus of Example 8, wherein when the verification of the first FCS detects the unrecoverable error, the processing circuitry is to refrain from verifying the second FCS, and to require the retransmission of the bit stream from the other Wi-Fi device.

Example 10 includes the apparatus of Example 8, wherein when the verification of the first FCS is successful, the processing circuitry is to verify the second FCS, and require the retransmission of the bit stream from the other Wi-Fi device when the number of error bits detected by the verification of the second FCS exceeds the predefined threshold, or otherwise transmit an acknowledge for the bit stream, via the RF interface, to the other Wi-Fi device.

Example 11 includes the apparatus of Example 8, wherein the PHY frame includes an additional byte in a high-efficiency signal-A (HE-SIG-A) field to indicate whether the MAC frame encapsulated therein is the original MAC frame or the video content specific MAC frame.

Example 12 includes the apparatus of Example 11, wherein the processing circuitry is to determine that the MAC frame encapsulated in the PHY frame is the original MAC frame, if the additional byte has a value of zero.

Example 13 includes the apparatus of Example 11, wherein the processing circuitry is to determine that the MAC frame encapsulated in the PHY frame is the video content specific MAC frame, if the additional byte has a non-zero value, the non-zero value is based on a length of the protocol information and the first FCS to indicate a location where the encoded video content starts in the video content specific MAC frame.

Example 14 includes the apparatus of Example 8, wherein the MAC frame includes a duplication of the protocol information and the first FCS for verifying the protocol information; and the PHY frame includes a duplication indication in a high-efficiency signal-A (HE-SIG-A) field to indicate that the protocol information and the first FCS have been duplicated.

Example 15 includes the apparatus of Example 14, wherein only when both the verification of the first FCS and a verification of the duplicated first FCS are invalid, the processing circuitry is to refrain from verifying the second FCS, and require the retransmission of the bit stream from the other Wi-Fi device.

Example 16 includes the apparatus of any of Examples 8-15, wherein the protocol information includes any of an MAC header, an Internet Protocol (IP) header, a Transmission Control Protocol (TCP) header, and a Real-time Transport Protocol (RTP)/Real Time Streaming Protocol (RTSP) header.

Example 17 includes the apparatus of any of Examples 8-16, wherein during an initial association establishment of the Wi-Fi device with the other Wi-Fi device, both a beacon frame and an association request frame received from the other Wi-Fi device include a new information element to indicate whether the other Wi-Fi device is able to deal with the video content specific MAC frame, and the processing circuitry is to encode an association response frame to include the new information element to indicate whether the Wi-Fi device is able to deal with the video content specific MAC frame.

Example 18 includes a non-transitory computer-readable storage medium having instructions stored thereon, which when executed by a processor of a Wi-Fi device, cause the Wi-Fi device to: encode a Medium Access Control (MAC) frame, to carry video content to be transmitted to one or more other Wi-Fi devices connected with the Wi-Fi device; encapsulate the MAC frame into a physical (PHY) frame, the PHY frame is to include an additional byte in a high-efficiency signal-A (HE-SIG-A) field, to indicate whether the MAC frame is encoded as an original MAC frame including one Frame Check Sequence (FCS) or a video content specific MAC frame including more than one FCSs; and transmit the PHY frame to the one or more other Wi-Fi devices.

Example 19 includes the non-transitory computer-readable storage medium of Example 18, wherein the instructions further cause the Wi-Fi device to: assign a value of zero to the additional byte, when the MAC frame is encoded as the original MAC frame; or assign a value of non-zero to the additional byte, when the MAC frame is encoded as the video content specific MAC frame.

Example 20 includes the non-transitory computer-readable storage medium of Example 19, wherein the more than one FCSs of the video content specific MAC frame includes a first FCS for verifying protocol information of the MAC frame and a second FCS for verifying the encoded video content.

Example 21 includes the non-transitory computer-readable storage medium of Example 20, wherein the non-zero value of the additional byte is assigned based on a length of the protocol information and the first FCS.

Example 22 includes the non-transitory computer-readable storage medium of Example 20, wherein the instructions further cause the Wi-Fi device to encode the MAC frame to have the protocol information and the first FCS duplicated; and the PHY frame is to include a duplication indication in the HE-SIG-A field to indicate that the protocol information and the first FCS have been duplicated.

Example 23 includes the non-transitory computer-readable storage medium of Example 20, wherein the protocol information includes any of an MAC header, an Internet Protocol (IP) header, a Transmission Control Protocol (TCP) header, and a Real-time Transport Protocol (RTP)/Real Time Streaming Protocol (RTSP) header.

Example 24 includes the non-transitory computer-readable storage medium of any of claims 18-23, wherein during initial association establishment of the Wi-Fi device with the one or more other Wi-Fi devices: the instructions further cause the Wi-Fi device to encode a beacon frame and an association request frame to be transmitted to each of the one or more other Wi-Fi devices to include a new information element to indicate whether the Wi-Fi device is able to deal with the video content specific MAC frame; and an association response frame received from each of the one or more other Wi-Fi devices is to include the new information element to indicate whether the Wi-Fi device is able to deal with the video content specific MAC frame.

Example 25 includes a non-transitory computer-readable storage medium having instructions stored thereon, which when executed by a processor of a Wi-Fi device, cause the Wi-Fi device to: receive a bit stream, transmitted from another Wi-Fi device connected with the Wi-Fi device; process the bit stream to obtain a physical (PHY) frame, wherein the PHY frame includes information to indicate whether a Medium Access Control (MAC) frame encapsulated therein is an original MAC frame including one Frame Check Sequence (FCS) or a video content specific MAC frame including a first FCS for verifying protocol information of the MAC frame and a second FCS for verifying video content encoded in the MAC frame; and in case that the information in the PHY frame indicates that the MAC frame is the video content specific MAC frame, require retransmission of the bit stream from the other Wi-Fi device, only when either of the following occurs: i) a verification of the first FCS detects an unrecoverable error; or ii) a number of error bits detected by a verification of the second FCS exceeds a predefined threshold.

Example 26 includes the non-transitory computer-readable storage medium of Example 25, wherein the instructions further cause the Wi-Fi device to refrain from verifying the second FCS, and require the retransmission of the bit stream from the other Wi-Fi device, when the verification of the first FCS detects the unrecoverable error.

Example 27 includes the non-transitory computer-readable storage medium of Example 25, wherein the instructions further cause the Wi-Fi device to: verify the second FCS when the verification of the first FCS is successful; and require the retransmission of the bit stream from the other Wi-Fi device when the number of error bits detected by the verification of the second FCS exceeds the predefined threshold.

Example 28 includes the non-transitory computer-readable storage medium of Example 25, wherein the PHY frame includes an additional byte in a high-efficiency signal-A (HE-SIG-A) field to indicate whether the MAC frame encapsulated therein is the original MAC frame or the video content specific MAC frame.

Example 29 includes the non-transitory computer-readable storage medium of Example 28, wherein the instructions further cause the Wi-Fi device to determine that the MAC frame encapsulated in the PHY frame is the original MAC frame, if the additional byte has a value of zero.

Example 30 includes the non-transitory computer-readable storage medium of Example 28, wherein the instructions further cause the Wi-Fi device to determine that the MAC frame encapsulated in the PHY frame is the video content specific MAC frame, if the additional byte has a non-zero value, the non-zero value is based on a length of the protocol information and the first FCS to indicate a location where the encoded video content starts in the video content specific MAC frame.

Example 31 includes the non-transitory computer-readable storage medium of Example 25, wherein the MAC frame includes a duplication of the protocol information and the first FCS for verifying the protocol information; and the PHY frame includes a duplication indication in a high-efficiency signal-A (HE-SIG-A) field to indicate that the protocol information and the first FCS have been duplicated.

Example 32 includes the non-transitory computer-readable storage medium of Example 31, wherein only when both the verification of the first FCS and a verification of the duplicated first FCS are invalid, the instructions further cause the Wi-Fi device to refrain from verifying the second FCS, and require the retransmission of the bit stream from the other Wi-Fi device.

Example 33 includes the non-transitory computer-readable storage medium of any of Examples 25-32, wherein the protocol information includes any of an MAC header, an Internet Protocol (IP) header, a Transmission Control Protocol (TCP) header, and a Real-time Transport Protocol (RTP)/Real Time Streaming Protocol (RTSP) header.

Example 34 includes the non-transitory computer-readable storage medium of any of Examples 25-33, wherein during an initial association establishment of the Wi-Fi device with the other Wi-Fi device, both a beacon frame and an association request frame received from the other Wi-Fi device include a new information element to indicate whether the other Wi-Fi device is able to deal with the video content specific MAC frame, and the instructions further cause the Wi-Fi device to encode an association response frame to include the new information element to indicate whether the Wi-Fi device is able to deal with the video content specific MAC frame.

Example 35 includes a method to be performed by a Wi-Fi device, comprising: encoding a Medium Access Control (MAC) frame, to carry video content to be transmitted to one or more other Wi-Fi devices connected with the Wi-Fi device; encapsulating the MAC frame into a physical (PHY) frame, the PHY frame is to include an additional byte in a high-efficiency signal-A (HE-SIG-A) field, to indicate whether the MAC frame is encoded as an original MAC frame including one Frame Check Sequence (FCS) or a video content specific MAC frame including more than one FCSs; and transmitting the PHY frame to the one or more other Wi-Fi devices.

Example 36 includes the method of Example 35, further comprising: assigning a value of zero to the additional byte, when the MAC frame is encoded as the original MAC frame; or assigning a value of non-zero to the additional byte, when the MAC frame is encoded as the video content specific MAC frame.

Example 37 includes the method of Example 36, wherein the more than one FCSs of the video content specific MAC frame includes a first FCS for verifying protocol information of the MAC frame and a second FCS for verifying the encoded video content.

Example 38 includes the method of Example 37, wherein the non-zero value of the additional byte is assigned based on a length of the protocol information and the first FCS.

Example 39 includes the method of Example 37, further comprising encoding the MAC frame to have the protocol information and the first FCS duplicated, and wherein the PHY frame is to include a duplication indication in the HE-SIG-A field to indicate that the protocol information and the first FCS have been duplicated.

Example 40 includes the method of Example 37, wherein the protocol information includes any of an MAC header, an Internet Protocol (IP) header, a Transmission Control Protocol (TCP) header, and a Real-time Transport Protocol (RTP)/Real Time Streaming Protocol (RTSP) header.

Example 41 includes the method of any of Examples 35-37, wherein during initial association establishment of the Wi-Fi device with the one or more other Wi-Fi devices: the method comprises encoding a beacon frame and an association request frame to be transmitted to each of the one or more other Wi-Fi devices to include a new information element to indicate whether the Wi-Fi device is able to deal with the video content specific MAC frame; and wherein an association response frame received from each of the one or more other Wi-Fi devices is to include the new information element to indicate whether the Wi-Fi device is able to deal with the video content specific MAC frame.

Example 42 includes an apparatus for a Wi-Fi device, comprising means for performing the method of any of Examples 35-41

Example 43 includes a method to be performed by a Wi-Fi device, comprising: receiving a bit stream, transmitted from another Wi-Fi device connected with the Wi-Fi device; processing the bit stream to obtain a physical (PHY) frame, wherein the PHY frame includes information to indicate whether a Medium Access Control (MAC) frame encapsulated therein is an original MAC frame including one Frame Check Sequence (FCS) or a video content specific MAC frame including a first FCS for verifying protocol information of the MAC frame and a second FCS for verifying video content encoded in the MAC frame; and in case that the information in the PHY frame indicates that the MAC frame is the video content specific MAC frame, requiring retransmission of the bit stream from the other Wi-Fi device, only when either of the following occurs: i) a verification of the first FCS detects an unrecoverable error; or ii) a number of error bits detected by a verification of the second FCS exceeds a predefined threshold.

Example 44 includes the method of Example 43, further comprising: refraining from verifying the second FCS, and requiring the retransmission of the bit stream from the other Wi-Fi device, when the verification of the first FCS detects the unrecoverable error.

Example 45 includes the method of Example 43, further comprising: verifying the second FCS when the verification of the first FCS is successful; and requiring the retransmission of the bit stream from the other Wi-Fi device when the number of error bits detected by the verification of the second FCS exceeds the predefined threshold.

Example 46 includes the method of Example 43, wherein the PHY frame includes an additional byte in a high-efficiency signal-A (HE-SIG-A) field to indicate whether the MAC frame encapsulated therein is the original MAC frame or the video content specific MAC frame.

Example 47 includes the method of Example 46, wherein the instructions further cause the Wi-Fi device to determine that the MAC frame encapsulated in the PHY frame is the original MAC frame, if the additional byte has a value of zero.

Example 48 includes the method of Example 46, further comprising: determining that the MAC frame encapsulated in the PHY frame is the video content specific MAC frame, if the additional byte has a non-zero value, the non-zero value is based on a length of the protocol information and the first FCS to indicate a location where the encoded video content starts in the video content specific MAC frame.

Example 49 includes the method of Example 43, wherein the MAC frame includes a duplication of the protocol information and the first FCS for verifying the protocol information; and the PHY frame includes a duplication indication in a high-efficiency signal-A (HE-SIG-A) field to indicate that the protocol information and the first FCS have been duplicated.

Example 50 includes the method of Example 49, further comprising: refraining from verifying the second FCS, and requiring the retransmission of the bit stream from the other Wi-Fi device, only when both the verification of the first FCS and a verification of the duplicated first FCS are invalid.

Example 51 includes the method of Example 43, wherein the protocol information includes any of an MAC header, an Internet Protocol (IP) header, a Transmission Control Protocol (TCP) header, and a Real-time Transport Protocol (RTP)/Real Time Streaming Protocol (RTSP) header.

Example 52 includes the method of any of Examples 43-51, wherein during an initial association establishment of the Wi-Fi device with the other Wi-Fi device, both a beacon frame and an association request frame received from the other Wi-Fi device include a new information element to indicate whether the other Wi-Fi device is able to deal with the video content specific MAC frame, and the method further comprises encoding an association response frame to include the new information element to indicate whether the Wi-Fi device is able to deal with the video content specific MAC frame.

Example 53 includes an apparatus for a Wi-Fi device, comprising means for performing the method of any of claims 43-52.

Example 54 includes a communication system, comprising the apparatus of any of claims 1-7, and the apparatus of any of claims 8-17.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for a Wireless Fidelity (Wi-Fi) device, the apparatus comprising:
   a Radio Frequency (RF) interface; and
   processing circuitry, coupled with the RF interface, the processing circuitry is to:
   encode a Medium Access Control (MAC) frame, to carry video content to be transmitted to one or more other Wi-Fi devices connected with the Wi-Fi device;
   encapsulate the MAC frame into a physical (PHY) frame, the PHY frame is to include an additional byte in a high-efficiency signal-A (HE-SIG-A) field, to indicate whether the MAC frame is encoded as an original MAC frame including one Frame Check Sequence (FCS) or a video content specific MAC frame including more than one FCSs; and
   transmit the PHY frame, via the RF interface, to the one or more other Wi-Fi devices.

2. The apparatus of claim 1, wherein:
   when the MAC frame is encoded as the original MAC frame, the processing circuitry is to assign a value of zero to the additional byte; and
   when the MAC frame is encoded as the video content specific MAC frame, the processing circuitry is to assign a value of non-zero to the additional byte.

3. The apparatus of claim 2, wherein:
   the more than one FCSs of the video content specific MAC frame includes a first FCS for verifying protocol information of the MAC frame and a second FCS for verifying the encoded video content.

4. The apparatus of claim 3, wherein the non-zero value of the additional byte is assigned based on a length of the protocol information and the first FCS.

5. The apparatus of claim 3, the processing circuitry is to encode the MAC frame to have the protocol information and the first FCS duplicated; and
   the PHY frame is to include a duplication indication in the HE-SIG-A field to indicate that the protocol information and the first FCS have been duplicated.

6. The apparatus of claim 3, wherein the protocol information includes any of an MAC header, an Internet Protocol (IP) header, a Transmission Control Protocol (TCP) header, and a Real-time Transport Protocol (RTP)/Real Time Streaming Protocol (RTSP) header.

7. The apparatus of claim 1, wherein during initial association establishment of the Wi-Fi device with the one or more other Wi-Fi devices: the processing circuitry is to encode a beacon frame and an association request frame to be transmitted to each of the one or more other Wi-Fi devices to include a new information element to indicate whether the Wi-Fi device is able to deal with the video content specific MAC frame; and an association response frame received from each of the one or more other Wi-Fi devices is to include the new information element to indicate whether the Wi-Fi device is able to deal with the video content specific MAC frame.

8. An apparatus for a Wireless Fidelity (Wi-Fi) device, the apparatus comprising:
   a Radio Frequency (RF) interface to receive a bit stream, transmitted from another Wi-Fi device connected with the Wi-Fi device; and
   processing circuitry, coupled with the RF interface, the processing circuitry is to process the bit stream to obtain a physical (PHY) frame, wherein the PHY frame includes information to indicate whether a Medium Access Control (MAC) frame encapsulated therein is an original MAC frame including one Frame Check Sequence (FCS) or a video content specific MAC frame including a first FCS for verifying protocol information of the MAC frame and a second FCS for verifying video content encoded in the MAC frame; and
   in case that the information in the PHY frame indicates that the MAC frame is the video content specific MAC frame, the processing circuitry is to require retransmission of the bit stream from the other Wi-Fi device, only when either of the following occurs: i) a verification of the first FCS detects an unrecoverable error; or ii) a number of error bits detected by a verification of the second FCS exceeds a predefined threshold.

9. The apparatus of claim 8, wherein when the verification of the first FCS detects the unrecoverable error, the processing circuitry is to refrain from verifying the second FCS, and to require the retransmission of the bit stream from the other Wi-Fi device.

10. The apparatus of claim 8, wherein when the verification of the first FCS is successful, the processing circuitry is to verify the second FCS, and require the retransmission of the bit stream from the other Wi-Fi device when the number of error bits detected by the verification of the second FCS exceeds the predefined threshold, or otherwise transmit an acknowledge for the bit stream, via the RF interface, to the other Wi-Fi device.

11. The apparatus of claim 8, wherein the PHY frame includes an additional byte in a high-efficiency signal-A (HE-SIG-A) field to indicate whether the MAC frame encapsulated therein is the original MAC frame or the video content specific MAC frame.

12. The apparatus of claim 11, wherein the processing circuitry is to determine that the MAC frame encapsulated in the PHY frame is the original MAC frame, if the additional byte has a value of zero.

13. The apparatus of claim 11, wherein the processing circuitry is to determine that the MAC frame encapsulated in the PHY frame is the video content specific MAC frame, if the additional byte has a non-zero value, the non-zero value is based on a length of the protocol information and the first FCS to indicate a location where the encoded video content starts in the video content specific MAC frame.

14. The apparatus of claim 8, wherein the MAC frame includes a duplication of the protocol information and the first FCS for verifying the protocol information; and the PHY frame includes a duplication indication in a high-efficiency signal-A (HE-SIG-A) field to indicate that the protocol information and the first FCS have been duplicated.

15. The apparatus of claim 14, wherein only when both the verification of the first FCS and a verification of the duplicated first FCS are invalid, the processing circuitry is to refrain from verifying the second FCS, and require the retransmission of the bit stream from the other Wi-Fi device.

16. The apparatus of claim 8, wherein the protocol information includes any of an MAC header, an Internet Protocol (IP) header, a Transmission Control Protocol (TCP) header, and a Real-time Transport Protocol (RTP)/Real Time Streaming Protocol (RTSP) header.

17. The apparatus of claim 8, wherein during an initial association establishment of the Wi-Fi device with the other Wi-Fi device, both a beacon frame and an association request frame received from the other Wi-Fi device include a new information element to indicate whether the other Wi-Fi device is able to deal with the video content specific MAC frame, and the processing circuitry is to encode an association response frame to include the new information element to indicate whether the Wi-Fi device is able to deal with the video content specific MAC frame.

18. A non-transitory computer-readable storage medium having instructions stored thereon, which when executed by a processor of a Wi-Fi device, cause the Wi-Fi device to:
encode a Medium Access Control (MAC) frame, to carry video content to be transmitted to one or more other Wi-Fi devices connected with the Wi-Fi device;
encapsulate the MAC frame into a physical (PHY) frame, the PHY frame is to include an additional byte in a high-efficiency signal-A (HE-SIG-A) field, to indicate whether the MAC frame is encoded as an original MAC frame including one Frame Check Sequence (FCS) or a video content specific MAC frame including more than one FCSs; and
transmit the PHY frame to the one or more other Wi-Fi devices.

19. The non-transitory computer-readable storage medium of claim 18, wherein the instructions further cause the Wi-Fi device to:
assign a value of zero to the additional byte, when the MAC frame is encoded as the original MAC frame; or
assign a value of non-zero to the additional byte, when the MAC frame is encoded as the video content specific MAC frame.

20. The non-transitory computer-readable storage medium of claim 19, wherein the more than one FCSs of the video content specific MAC frame includes a first FCS for verifying protocol information of the MAC frame and a second FCS for verifying the encoded video content.

21. The non-transitory computer-readable storage medium of claim 20, wherein the non-zero value of the additional byte is assigned based on a length of the protocol information and the first FCS.

22. A non-transitory computer-readable storage medium having instructions stored thereon, which when executed by a processor of a Wi-Fi device, cause the Wi-Fi device to:
receive a bit stream, transmitted from another Wi-Fi device connected with the Wi-Fi device;
process the bit stream to obtain a physical (PHY) frame, wherein the PITY frame includes information to indicate whether a Medium Access Control (MAC) frame encapsulated therein is an original MAC frame including one Frame Check Sequence (FCS) or a video content specific MAC frame including a first FCS for verifying protocol information of the MAC frame and a second FCS for verifying video content encoded in the MAC frame; and
in case that the information in the PHY frame indicates that the MAC frame is the video content specific MAC frame, require retransmission of the bit stream from the other Wi-Fi device, only when either of the following occurs: i) a verification of the first FCS detects an unrecoverable error; or ii) a number of error bits detected by a verification of the second FCS exceeds a predefined threshold.

23. The non-transitory computer-readable storage medium of claim 22, wherein the instructions further cause the Wi-Fi device to refrain from verifying the second FCS, and require the retransmission of the bit stream from the other Wi-Fi device, when the verification of the first FCS detects the unrecoverable error.

24. The non-transitory computer-readable storage medium of claim 22, wherein the instructions further cause the Wi-Fi device to:
verify the second FCS when the verification of the first FCS is successful; and
require the retransmission of the bit stream from the other Wi-Fi device when the number of error bits detected by the verification of the second FCS exceeds the predefined threshold.

25. The non-transitory computer-readable storage medium of claim 22, wherein the PHY frame includes an additional byte in a high-efficiency signal-A (HE-SIG-A) field to indicate whether the MAC frame encapsulated therein is the original MAC frame or the video content specific MAC frame.

* * * * *